US011126975B2

(12) United States Patent
Haldenby et al.

(10) Patent No.: US 11,126,975 B2
(45) Date of Patent: Sep. 21, 2021

(54) SYSTEMS AND METHOD FOR TRACKING BEHAVIOR OF NETWORKED DEVICES USING HYBRID PUBLIC-PRIVATE BLOCKCHAIN LEDGERS

(71) Applicant: The Toronto-Dominion Bank, Mississauga (CA)

(72) Inventors: Perry Aaron Jones Haldenby, Mississauga (CA); Rajan Mahadevan, Mississauga (CA); John Jong Suk Lee, Waterloo (CA); Paul Mon-Wah Chan, Markham (CA); Orin Del Vecchio, Richmond Hill (CA)

(73) Assignee: The Toronto-Dominion Bank, Toronto (CA)

( * ) Notice: Subject to any disclaimer, the term of this patent is extended or adjusted under 35 U.S.C. 154(b) by 1420 days.

(21) Appl. No.: 14/935,829

(22) Filed: Nov. 9, 2015

(65) Prior Publication Data
US 2017/0046652 A1     Feb. 16, 2017

Related U.S. Application Data

(60) Provisional application No. 62/204,768, filed on Aug. 13, 2015.

(51) Int. Cl.
*G06Q 20/38*     (2012.01)
*G06Q 20/06*     (2012.01)
(Continued)

(52) U.S. Cl.
CPC ......... *G06Q 20/0655* (2013.01); *G06F 21/62* (2013.01); *G06F 21/645* (2013.01);
(Continued)

(58) Field of Classification Search
CPC .................................................. G06Q 10/0833
(Continued)

(56) References Cited

U.S. PATENT DOCUMENTS 7,194,543 B2    3/2007    Corneille et al.
7,324,976 B2    1/2008    Gupta et al.
(Continued)

FOREIGN PATENT DOCUMENTS

EP        1693804          8/2006
WO    WO 2013/112642 A1    8/2013
WO    WO 2001/029777       2/2015

OTHER PUBLICATIONS

Herbert et al., "A Novel Method for Decentralised Peer-to-Peer Software License Validation Using Cryptocurrency Blockchain Technology," Proceedings of the $38^{th}$ Australian Computer Science Conference, Jan. 27-30, 2015, pp. 27-35.
(Continued)

*Primary Examiner* — Chinedu C Agwumezie
(74) *Attorney, Agent, or Firm* — Duane Morris LLP

(57) ABSTRACT

The disclosed embodiments include computerized systems and methods for generating secured blockchain-based ledger data structures that track an ownership and usage of one or more assets, such as Internet-connected devices. In one instance, an apparatus associated with a rules authority of the secured blockchain-based ledger may detect an occurrence of a triggering event, and may access and decrypt a set of rules hashed into the secured blockchain-based ledger using a confidentially-held master cryptographic key. The apparatus may identify a rule associated with the detected event, and perform one or more operations consistent with the rule, including a determination of metrics indicative of a care, risk, and/or valuation of one or more of the Internet-connected devices, and additionally or alternatively, a modi-
(Continued)

fication of an operational or communicative functionality of the Internet-connected devices.

24 Claims, 8 Drawing Sheets

(51) Int. Cl.

| | |
|---|---|
| G06F 21/64 | (2013.01) |
| H04N 5/913 | (2006.01) |
| G06Q 20/36 | (2012.01) |
| G06Q 10/06 | (2012.01) |
| G06Q 10/10 | (2012.01) |
| G06Q 50/08 | (2012.01) |
| G06Q 20/10 | (2012.01) |
| G06Q 20/40 | (2012.01) |
| G06F 21/62 | (2013.01) |
| H04L 9/08 | (2006.01) |
| G06Q 50/18 | (2012.01) |
| H04L 9/32 | (2006.01) |
| H04L 29/06 | (2006.01) |
| G06Q 10/08 | (2012.01) |
| G06Q 30/02 | (2012.01) |
| G06Q 40/00 | (2012.01) |
| G06Q 40/08 | (2012.01) |

(52) U.S. Cl.
CPC . *G06Q 10/0631* (2013.01); *G06Q 10/063114* (2013.01); *G06Q 10/08* (2013.01); *G06Q 10/103* (2013.01); *G06Q 10/1097* (2013.01); *G06Q 20/065* (2013.01); *G06Q 20/102* (2013.01); *G06Q 20/367* (2013.01); *G06Q 20/3829* (2013.01); *G06Q 20/401* (2013.01); *G06Q 20/405* (2013.01); *G06Q 20/4016* (2013.01); *G06Q 30/0214* (2013.01); *G06Q 40/08* (2013.01); *G06Q 40/128* (2013.12); *G06Q 50/08* (2013.01); *G06Q 50/18* (2013.01); *H04L 9/0816* (2013.01); *H04L 9/0861* (2013.01); *H04L 9/0891* (2013.01); *H04L 9/0894* (2013.01); *H04L 9/3247* (2013.01); *H04L 63/061* (2013.01); *H04L 63/062* (2013.01); *H04L 63/0876* (2013.01); *H04N 5/913* (2013.01); *G06Q 2220/00* (2013.01); *G06Q 2220/10* (2013.01); *G06Q 2230/00* (2013.01); *H04L 63/0435* (2013.01); *H04L 63/0442* (2013.01); *H04L 63/08* (2013.01); *H04L 63/12* (2013.01); *H04L 2209/24* (2013.01); *H04L 2209/38* (2013.01); *H04L 2209/56* (2013.01); *H04N 2005/91342* (2013.01); *Y02P 90/80* (2015.11); *Y04S 10/50* (2013.01)

(58) Field of Classification Search
USPC .......................................................... 705/50
See application file for complete search history.

(56) References Cited

U.S. PATENT DOCUMENTS

| | | |
|---|---|---|
| 7,703,140 B2 | 8/2010 | Nath et al. |
| 8,135,134 B2 | 3/2012 | Orsini et al. |
| 8,150,769 B2 | 4/2012 | Gupta et al. |
| 8,327,138 B2 | 12/2012 | Nath et al. |
| 8,347,088 B2 | 1/2013 | Moore et al. |
| 8,651,375 B1 | 2/2014 | Gouldd et al. |
| 9,014,661 B2 | 4/2015 | DeCharms |
| 2002/0111907 A1 | 8/2002 | Ling |
| 2002/0128917 A1 | 9/2002 | Grounds |
| 2003/0126079 A1 | 7/2003 | Roberson et al. |
| 2005/0024201 A1 | 2/2005 | Culpepper et al. |
| 2005/0091173 A1 | 4/2005 | Alve |
| 2006/0242038 A1 | 10/2006 | Guidilli |
| 2006/0277127 A1 | 12/2006 | Pierdinock |
| 2007/0046689 A1 | 3/2007 | Tokimoto et al. |
| 2011/0106685 A1 | 5/2011 | Silbert |
| 2014/0005809 A1 | 1/2014 | Frei et al. |
| 2014/0344015 A1 | 11/2014 | Puértolas-Montañés et al. |
| 2015/0046337 A1 | 2/2015 | Hu et al. |
| 2015/0081566 A1 | 3/2015 | Slepinin |
| 2015/0127812 A1* | 5/2015 | Cheng ................... G06F 3/0619 709/224 |
| 2015/0128240 A1 | 5/2015 | Richards et al. |
| 2015/0220892 A1 | 8/2015 | Allen |
| 2015/0371548 A1 | 12/2015 | Samid |
| 2016/0065540 A1 | 3/2016 | Androulaki et al. |
| 2016/0162897 A1 | 6/2016 | Feeney |
| 2016/0210626 A1 | 7/2016 | Ortiz |
| 2016/0253663 A1 | 9/2016 | Clark |
| 2016/0259937 A1* | 9/2016 | Ford ..................... G06F 21/577 |
| 2016/0260169 A1* | 9/2016 | Arnold .................. G06Q 40/12 |
| 2016/0292680 A1 | 10/2016 | Wilson, Jr. |
| 2016/0306982 A1 | 10/2016 | Seger et al. |
| 2016/0342989 A1 | 11/2016 | Davis |
| 2016/0358165 A1 | 12/2016 | Maxwell |
| 2017/0124556 A1* | 5/2017 | Seger, II ................. H04L 69/40 |
| 2017/0177898 A1 | 6/2017 | Dillenberger |
| 2017/0236217 A1* | 8/2017 | Suggula ................. G06Q 40/12 705/30 |

OTHER PUBLICATIONS

Danezis et al., "Centrally Banked Cryptocurrencies," May 26, 2015 (13 pages).
Noyen et al., "When Money Learns to Fly: Towards Sensing as a Service Applications Using Bitcoin," Sep. 20, 2014 (6 pages).
"Ajusto™ program with telematics device," retrieved from http://www.thepersonal.com/p-on/en/insurance-products/auto-insurance/pages/device-auto-insurance-program.aspx on Nov. 9, 2015 (2 pages).
Taylor, "Will Insurance Companies Use Smart Appliances to Monitor 'Unhealthy' Habits?" Old-Thinker News (retrieved from http://www.oldthinkernews.com/2013/10/21/will-insurance-companies-use-smart-appliances-to-monitor-unhealthy-habits), Oct. 22, 2013 (6 pages).
Porter et al., "How Smart, Connected Products Are Transforming Competition," Harvard Business Review, Nov. 2014 (38 pages).
"Open-source Internet of Things Micropayment Processing Hits the Market," Bitcointalk.org, Jul. 2015, retrieved from https://bitcointalk.org/index.php?topic=854280;imode on Sep. 30, 2016 (3 pages).
"How it Works," retrieved from https://toronto.car2go.com/how-it-works/ on Sep. 30, 2016 (8 pages).
Karame et al., "Pay as you Browse: Microcomputations as Micropayments in Web-based Services," Proceedings of WWW 2011—Session: E-commerce, Mar. 28-Apr. 1, 2011, pp. 307-316.
Ectors, M., "Five new businesses for Telefonica Digital," Sep. 21, 2011, retrieved from https://telruptive.com/tag/micro-payment on Sep. 30, 2016 (1 page).
Dawson, R., "The new layer of the economy enabled by M2M payments in the Internet of Things," Sep. 16, 2014, retrieved from http://rossdawsonblog.com/weblog/archives/2014/09/new-layer-economy-enabled-m2m-payments-internet-things.html on Sep. 30, 2016 (7 pages).
Lubani, "MEC in damage control over donor's lack of disbursement of funds for election," The Oracle, Jun. 11, 2014 (3 pages).
Benchmark Consulting Services, LLC, "Construction Monitoring and Disbursement Control," retrieved from https://www.benchmark-consulting.com/construction-monitoring-and-disbursement-control.html on Nov. 3, 2015 (1 page).

* cited by examiner

SYSTEMS AND METHOD FOR TRACKING BEHAVIOR OF NETWORKED DEVICES USING HYBRID PUBLIC-PRIVATE BLOCKCHAIN LEDGERS

CROSS-REFERENCE TO RELATED APPLICATIONS

This application claims the benefit of U.S. Provisional Patent Application No. 62/204,768, filed Aug. 13, 2015, which is expressly incorporated by reference herein to its entirety.

DESCRIPTION

Technical Field

The disclosed embodiments generally relate to computerized systems and methods for securing data, and more particularly, and without limitation, computerized systems and methods that generate secured blockchain-based ledger structures.

Background

Modern commercial enterprises, such as financial institutions, multinational corporations, and law firms, often link together multiple, fragmented, and geographically dispersed business units and lines-of-business. Although operating within a common enterprise, the fragmented nature of these distinct business units and lines-of-business renders complex any attempt to accurately identify and capture the various points of customer interaction across the enterprise. Further, devices operating within these fragmented and geographically dispersed business units and lines-of-business often execute various and often mutually-incompatible software applications (with corresponding mutually-incompatible data inputs and outputs), which often prevents the timely aggregation of data captured across the enterprise devices and the dissemination of the aggregated data within the enterprise. The lack of business-unit and line-of-business integration may lead to an environment characterized by incoherent customer management, which may prevent conventional database architectures from tracking and quantifying occurrences of enterprise-specific events.

Further, many modern commercial enterprises, financial institutions, and insurance companies track an ownership and usage of various assets based on data manually collected and manually input into one or more database structures (e.g., through corresponding graphical user interfaces). The manual nature of these conventional data collection processes often introduces a lag between the actual asset condition and the most current database records for the assets, which may negatively impact an ability of these conventional processes to value, insure, finance, and sell the various assets.

SUMMARY

The disclosed embodiments relate to computerized systems and methods that generate secured blockchain-based ledger structures tracking occurrences of events across fragmented and geographically dispersed enterprises.

In one embodiment, an apparatus may include at least one processor and a memory storing executable instructions that, when executed by the at least one processor, causes the at least one processor to perform the step of accessing data corresponding to at least one blockchain ledger. The executed instructions may further cause the at least one processor to perform the step of decrypting (i) a first encrypted portion of the blockchain ledger data using a first cryptographic key and (ii) a second encrypted portion of the blockchain ledger data using a second cryptographic key. In one aspect, the decrypted first data portion may identify a plurality of triggering events, and the decrypted second data portion may identify a plurality of rules associated with a rules authority. The executed instructions may further cause the at least one processor to perform the steps of obtaining a third portion of the blockchain ledger data indicative of a usage of a first asset during a corresponding time period, and determining an occurrence of at least one of the triggering events based on the obtained third data portion. In certain aspects, the identified triggering event may be related to the usage of the first asset during the corresponding time period. In response to the determination, the executed instructions may further cause the at least one processor to perform the steps of identifying at least one of the rules that exhibits a causal relationship with the detected event and generating an electronic command to perform one or more operations consistent with the at least one identified rule.

In other embodiments, a computer-implemented method may include the steps of accessing, using at least one processor, data corresponding to at least one blockchain ledger, and using the at least one processor, decrypting (i) a first encrypted portion of the blockchain ledger data using a first cryptographic key and (ii) a second encrypted portion of the blockchain ledger data using a second cryptographic key. In one aspect, the decrypted first data portion may identify a plurality of triggering events, and the decrypted second data portion may identify a plurality of rules associated with a rules authority. The method may also include obtaining, using the at least one processor, a third portion of the blockchain ledger data indicative of a usage of a first asset during a corresponding time period, and determining, using the at least one processor, an occurrence of at least one of the triggering events based on the obtained third data portion. The identified triggering event may be related to the usage of the first asset during the corresponding time period. In response to the determination, the method may also include identifying, using the at least one processor, at least one of the rules that exhibits a causal relationship with the detected event, and generating, using the at least one processor, an electronic command to perform one or more operations consistent with the at least one identified rule.

The disclosed embodiments also include apparatus including at least one processor and a memory storing executable instructions that, when executed by the at least one processor, causes the at least one processor to perform the step of accessing data corresponding to at least one blockchain ledger. The executed instructions may further cause the at least one processor to perform the step of decrypting (i) a first encrypted portion of the blockchain ledger data using a first cryptographic key and (ii) a second encrypted portion of the blockchain ledger data using a second cryptographic key. In one aspect, the decrypted first data portion may identify a plurality of triggering events, and the decrypted second data portion may identify a plurality of rules associated with a rules authority. The executed instructions may further cause the at least one processor to perform the steps of obtaining a third portion of the blockchain ledger data indicative of a usage of a connected device during a corresponding time period, and detecting, based on the obtained third data, an occurrence of at least one of the triggering events, the at least one triggering event corresponding to at least one of (i) a disposition of the connected device within a predetermined geographic region or (ii) a consumption of data by the connected device that exceeds a predetermined threshold value. In response to the determination, the executed instructions may further cause the at least one processor to perform the step of identifying at least one of the rules that exhibits a causal relationship with the detected event. The at least one rule may identify a modification to a functionality of the connected device. The executed instructions may further cause the at least one processor to perform the step of generating an electronic command to transmit information identifying the modification to the connected device. The transmitted information may cause the connected device to modify the functionality in accordance with the transmitted information.

It is to be understood that both the foregoing general description and the following detailed description are exemplary and explanatory only, and are not restrictive of the disclosed embodiments as claimed. Further, the accompanying drawings, which are incorporated in and constitute a part of this specification, illustrate aspects of the present disclosure and together with the description, serve to explain principles of the disclosed embodiments as set forth in the accompanying claims

DETAILED DESCRIPTION

Figure 1:
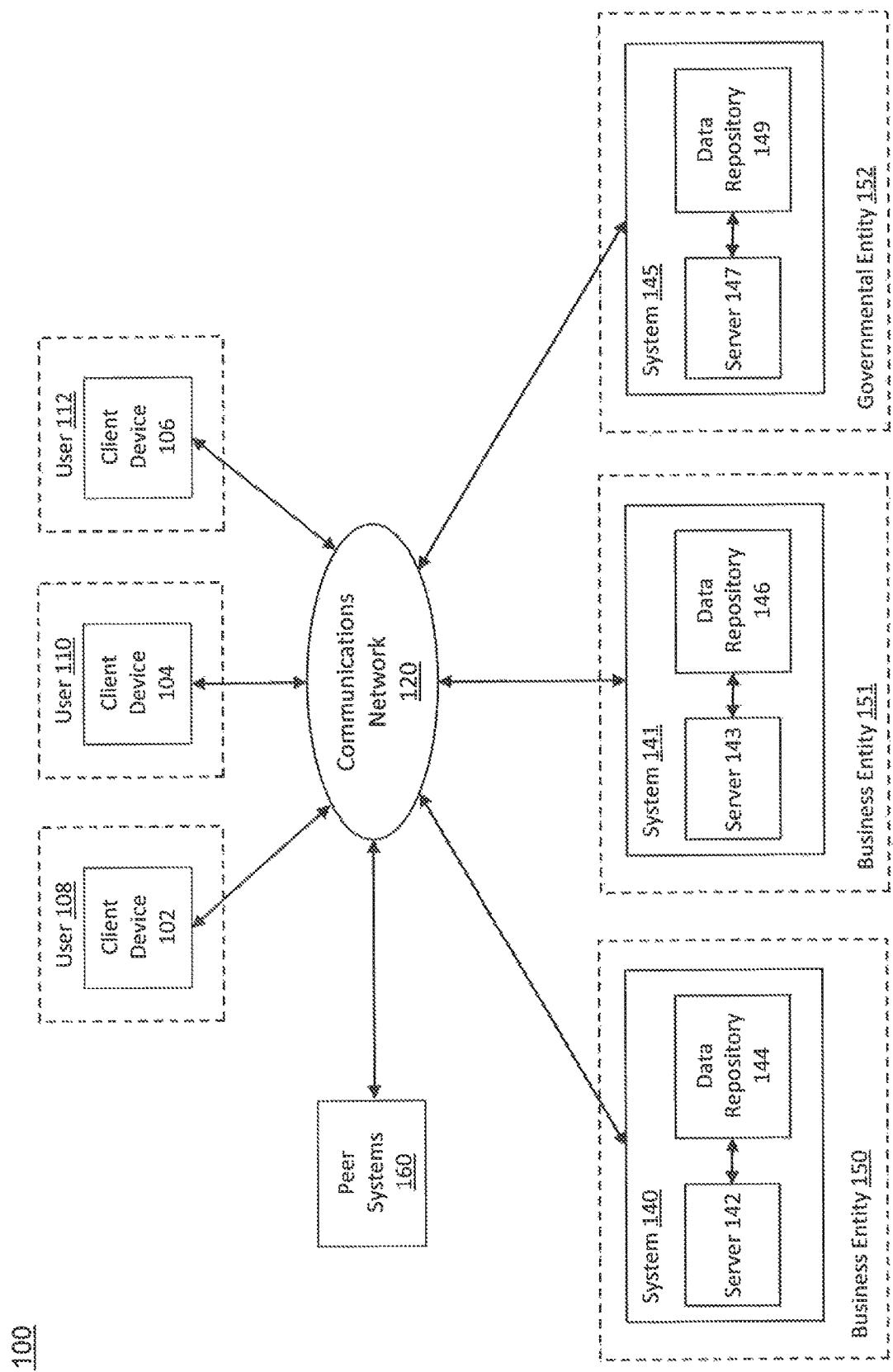
FIG. 1 is a diagram of an exemplary computing environment, consistent with disclosed embodiments.

Reference will now be made in detail to the disclosed embodiments, examples of which are illustrated in the accompanying drawings. The same reference numbers in the drawings and this disclosure are intended to refer to the same or like elements, components, and/or parts.

In this application, the use of the singular includes the plural unless specifically stated otherwise. In this application, the use of "or" means "and/or" unless stated otherwise. Furthermore, the use of the term "including," as well as other forms such as "includes" and "included," is not limiting. In addition, terms such as "element" or "component" encompass both elements and components comprising one unit, and elements and components that comprise more than one subunit, unless specifically stated otherwise. Additionally, the section headings used herein are for organizational purposes only and are not to be construed as limiting the subject matter described.

I. Exemplary Computing Environments, Networks, Systems, and Devices

FIG. 1 illustrates an exemplary computing environment 100 consistent with certain disclosed embodiments. In one aspect, computing environment 100 may include client devices 102, 104, and 106, system 140, peer systems 160, and a communications network 120 connecting one or more of the components of environment 100.

Consistent with the disclosed embodiments, one or more of the components of computing environment 100 may be configured to address problems inherent to conventional blockchain-based ledgers by embedding a private-master encryption key architecture into a conventional blockchain architecture (e.g., a blockchain-based architecture associated with the public Bitcoin™ ledger). In some aspects, the resulting hybrid blockchain architecture may facilitate a selective encryption of information by client devices 102, 104, and 106, system 140, and/or peer systems 160, thus providing a technical solution that protects sensitive and/or confidential instructions sets and event triggers and corresponding confidential instructions sets.

a. Exemplary Client Devices

In one embodiment, client devices 102, 104, and/or 106 may include a computing device, such as, but not limited to, a hashing computer, a personal computer, a laptop computer, a tablet computer, a notebook computer, a hand-held computer, a personal digital assistant, a portable navigation device, a mobile phone, a smart phone, a wearable computing device (e.g., a smart watch, a wearable activity monitor, wearable smart jewelry, and glasses and other optical devices that include optical head-mounted displays (OHMDs), an embedded computing device (e.g., in communication with a smart textile or electronic fabric), and any other type of computing device that may be configured to store data and software instructions, execute software instructions to perform operations, and/or display information on a display device(s), consistent with disclosed embodiments. In certain embodiments, at least one of client devices 102, 104, and/or 106 may be associated with one or more users, such as users 108, 110, and/or 112. For instance, user 110 may operate client device 104 and may do so to cause client device 104 to perform one or more operations consistent with the disclosed embodiments.

Client devices 102, 104, and/or 106 may include one or more tangible, non-transitory memories that store data and/or software instructions, and one or more processors configured to execute software instructions. Client devices 102, 104, and/or 106 may include one or more display devices that display information to a user and one or more input device(s) to allow the user to input information to client device 102, 104, and/or 106 (e.g., keypad, keyboard, touchscreen, voice activated control technologies, or any other type of known input device).

In one aspect, client devices 102, 104, and/or 106 may store in memory one or more software applications that run on client device 104 and are executed by the one or more processors. In some instances, client device 104 may store software applications that, when executed by one or more processors, perform operations that establish communications with one or more of peer systems 160 (e.g., across network 120) and that obtain, from peer systems 160, a current version of a hybrid blockchain ledger generated and maintained in accordance with the disclosed embodiments.

In other instances, and as described below, one or more of client devices 102, 104, and/or 106 may execute the one or more stored software application and to obtain data from the hybrid blockchain ledger that includes, but not limited to, data identifying one or more tracked assets, and/or a public key of one or more users. Further, and as described below, the one or more executed software applications may cause client devices 102, 104, and/or 106 to extract, from the one or more accessed blocks, a copy of an encrypted and/or hashed ownership/rules portion of the transaction block (e.g., including the identification a holder of a master key) and/or a copy of an encrypted and/or hashed master data block (e.g., encrypted using the master key and including rules permitting preconfigured and/or actions involving the tracked assets). In additional instances, and as further described below, client devices 102, 104, and/or 106 may provide information associated with one or more actions or transactions involving the tracked assets (e.g., information identifying the actions or transaction, information identifying the assets, a public key, a digital signature, etc.) to peer systems 160, along with copies of the encrypted and/or hashed rules engines and lists of triggering events.

In some aspects, the one or more stored applications may include a wallet application provided by business entity 150 (e.g., a mobile wallet application or an application executable on a desktop computer) and capable of initiating transactions denominated in one or more currencies, including virtual currencies such as Bitcoin™.

b. Exemplary Computer Systems

Systems 140, 141, and 145 may be computing systems configured to execute software instructions to perform one or more operations consistent with disclosed embodiments. In one aspect, systems 140 and 141 may be associated with business entities 150 and 151 (e.g., a financial institution) that provide financial accounts, financial services transactions, and investment services one or more users (e.g., customers of the business entities 150 and 151). In further aspects, system 145 may be associated with a governmental or regulatory entity 152 that, among other things, provides title and deed processing and recordation services to users (e.g., customers of governmental entity 152). In some aspects, systems 140, 141, and/or 145 may be distributed systems that may include computing components distributed across one or more networks, such as network 120, or other networks.

In one aspect, systems 140, 141, and 145 may include computing components configured to store, maintain, and generate data and software instructions. For example, system 140 may include one or more servers (e.g., server 142) and tangible, non-transitory memory devices (e.g., data repository 144). Similarly, system 141 may include one or more servers (e.g., server 143) and tangible, non-transitory memory devices (e.g., data repository 146), and system 145 may include one or more servers (e.g., server 147) and tangible, non-transitory memory devices (e.g., data repository 149).

Server 142 (and additionally or alternatively, servers 143 and 147) may include one or more computing devices that may be configured to execute software instructions to perform one or more processes consistent with the disclosed embodiments. In one example, server 142 may be a computing device that executes software instructions that perform operations that provides information to one or more other components of computing environment 100.

In one embodiment, server 142 (and additionally or alternatively, servers 143 and 147) may include a computer (e.g., a personal computer, network computer, or mainframe computer) having one or more processors that may be selectively activated or reconfigured by a computer program. In one aspect, server 142 (or other computing components of system 140) may be configured to provide one or more websites, digital portals, etc., that provide services consistent with business entity 150, such as a digital banking or investment portal, and services consistent with disclosed embodiments. For instance, server 142 may be configured to provide information associated with a requested web page over communications network 120 to client device 104, which may render the received information and present content from the web page on a display device, e.g., a touchscreen display unit.

In other aspects, servers 142, 143, and/or 147 (or other computing components of systems 140, 141, and/or 145) may be configured to provide information to one or more application programs executed by client device 104 (e.g., through a corresponding application programming interface (API)). For example, client device 104 may execute an application program associated with and provided by business entity 150, such a mobile banking application and/or a mobile wallet application, to provide services consistent with the disclosed embodiments. In some instances, server 142 may provide information to client devices 102, 104, and/or 106 (e.g., through the API associated with the executed application program), and client devices 102, 104, and/or 106 may be configured by the executed application program to present portions of the information to corresponding users through a corresponding graphical user interface (GUI).

In further aspects, servers 142, 143, and/or 147 (or other computing components of systems 140, 141, and/or 145) may be configured to provide to client devices 102, 104, and/or 106 (and/or receive from client device 104) information associated with services provided by business entities 150 and 151 and governmental entity 152. For example, client device 104 may receive the transmitted information, and store portions of the information in locally accessible storage device and/or network-accessible storage devices and data repositories (e.g., cloud-based storage). In one instance, client device 104 may execute stored instructions (e.g., an application program, a web browser, a mobile banking application, and/or a mobile wallet application) to process portions of the stored data and render portions of the stored data for presentation to user 110. Additionally, servers 142, 143, and/or 147 may be incorporated as a corresponding node in a distributed network, and additionally or alternatively, as a corresponding networked server in a cloud-computing environment. Furthermore, servers 142, 143, and/or 147 may communicate via network 120 with one or more additional servers (not shown), which may facilitate the distribution of processes for parallel execution by the additional servers.

In further aspects, business entity 150 may represent a "rules entity" capable of regulating transactions involving assets (e.g., units of virtual currency, units of various financial instruments, physical assets, connected devices, real estate, etc.) tracked within hybrid public-private ledgers consistent with the disclosed embodiments. Further, business entity 150, acting as the rules authority, may be capable of regulating transfers of ownership of these assets, either singly or jointly through subdivided interests, tracked within hybrid public-private ledgers consistent with the disclosed embodiments. By way of example, one or more computing components of system 140 (e.g., server 142) may be configured (e.g., by executed software instructions) to establish one or more rules that regulate a distributions of and/or transactions associated with the tracked assets, an initiation of transfers of the tracked assets (e.g., a sale, a use of the tracked assets as collateral in a secured transaction etc.), and further, any additional or alternate action involving the tracked assets and/or the hybrid public-private ledger (e.g., processes that generate additional cryptographic key sets for user 110, processes that recover assets tracked in the hybrid public-private ledger, etc.).

Additionally, in some aspects, system 140 may establish causal relationships between one or more of the established rules and one or more events that trigger an Initiation of one or more corresponding regulated distributions, transfers, and/or other actions involving assets tracked within the hybrid public-private ledger (e.g., "triggering events"). For example, a confirmed loss of a private cryptographic key issued to user 110 may represent a triggering event that causes system 140 to verify user 110's identity, initiate a transaction of the orphaned assets, generate a new pair of public and private cryptographic keys for user 110 (i.e., public and private blockchain keys), and transmit at least the private blockchain key to user 110 through secure, non-accessible processes, in accordance with one or more of the established rules.

Further, by way of example, a theft of a portion of user 110's tracked assets (e.g., units of virtual currency specified within one of more blocks of the hybrid public-private ledger) may represent a triggering event that causes system 140 to initiate a recovery protocol to generate a transaction request to recover the value of the stolen assets (e.g., to transfer the stolen assets back to user 110), and further, to generate a new pair of public and private blockchain keys for user 110, as described above. In other instances, a death and/or incapacitation of user 110 may represent a triggering event that causes system 140 to initiate a series of transaction to distribute of at least a portion of the tracked assets (e.g., through corresponding transaction requests consistent with the disclosed embodiments) to one or more additional owners identified by user 110 and specified within corresponding ones of the identified rules.

In some aspects, system 140 may be configured to establish one or more of the rules, and further, one or more of the causal relationships and triggering events, based on internal regulations associated with business entity 150. For example, the one or more internal regulations associated with business entity 150 may specify that system 140 verify an identity of user 110 (e.g., based on various forms of multi-factor authentication data) and/or obtain specific elements of documentation (e.g., a police report, etc.) prior to initiating the lost private key protocol and/or the recovery protocols outlined above. In other aspects, system 140 may one or more of the rules and/or triggering events based on information received from user 110 (e.g., as input provided to a web page or other graphical user interface (GUI) presented by client device 104 and provided to system 140). For example, user 110 may specify, as input to the web page or GUI presented by client device 104, one or more individuals that would receive portions of the tracked assets upon completion of one or more tasks and/or in the event of user 110's accidental death. The disclosed embodiments are, however, not limited to the exemplary triggering events and established rules described above, and in further aspects, the disclosed embodiments may be configured to generate any additional or alternate user- and system-specified rules and triggering events consistent with the hybrid public-private ledger and appropriate to the tracked assets, user 110, and/or business entity 150 (i.e., acting as a rules authority for the hybrid public-private ledger).

Further, and as outlined below, system 140 may be configured to store the one or more established rules (e.g., as a rules engine) and one or more of the established trigger events (e.g., as an event trigger list) within a portion of a local data repository (e.g., data repository 144). Additionally or alternatively, system 140 may be configured to store portions of the rules engine and/or event trigger list within a secure data repository accessible to system 140 across network 140 (e.g., cloud-based storage).

As described above, one or more computing components of system 140 (e.g., server 142) may be configured to generate pairs of public and private blockchain keys for user 110 (e.g., user 110's public/private blockchain key pair), and to provide the generated private blockchain key to user 110 through secure, non-accessible and/or out-of-band communications (e.g., by mail, etc.). In further embodiments, the one or more components of system 140 (e.g., server 142) may be configured to generate and maintain additional cryptographic keys that facilitate a generation and maintenance of portions of the hybrid public-private ledger. For instance, system 140 may be configured to generate a master key, which system 140 may leverage to encrypt the stored rules engine. In certain aspects, system 140 may store copies of the generated master key in a portion of data repository 144 that is not accessible to user 110 (and any other users), thus maintaining a confidence of the generated master key.

In additional aspects, system 140 may be configured to generate and maintain a private crypto key on behalf of user 110 (and additionally or alternatively, user 108 and 112), which system 140 may leverage to encrypt the stored event trigger list, and which may be provided to user 110 (and/or to user 108 and 112) through secure, non-accessible and/or out-of-band communications. Further, and as described above, system 140 may store copies of the private crypto keys in a portion of data repository 144.

Further, in additional embodiments, one or more computing components of system 140 (e.g., server 140) may be configured to hash the generated (and encrypted) rules engine and event trigger list into a genesis block associated with the hybrid public-private ledger. In other aspects, system 140 may provide the encrypted rules engine and event triggers list to one or more of peer system 160, which may be configured to hash the encrypted rules engine and event trigger list into the genesis block. By way of example, and by hashing the encrypted rules engine and event trigger list into the genesis block of the hybrid public-private ledger, the disclosed embodiments enable an in-band communication of the encrypted rules engine and event triggers from user to user within blocks (e.g., transactions) of the hybrid public-private ledger In additional embodiments, one or more computing components of system 141 (e.g., server 143) and/or system 145 (e.g., server 147) may perform one or more of the exemplary operations described above in reference to system 140, which facilitate business entity 151's and/or governmental entity 152's functionality as a "rules authority" within computing environment 100.

c. Exemplary Data Repositories and Stored Data

Data repositories 144, 146, and/or 149 may include one or more memories that are configured to store and provide access to data and/or software instructions. Such memories may include tangible non-transitory computer-readable media that store software instructions that, when executed by one or more processors (e.g., of servers 142, 143, and/or 147), perform one or more operations consistent with disclosed embodiments. Data repositories 144, 146, and/or 149 may also be configured to store information relating to business entities 150 and 151, e.g., financial institutions, and/or governmental entity 152.

For instance, data repositories 144, 146, and/or 149 may store customer data that uniquely identifies customers of a financial institution associated with systems 140, 141, and/or 145. By way of example, a customer of the financial institution (e.g., users 108, 110, and/or 112) may access a web page associated with system 140 (e.g., through a web server executed by a corresponding front end), and may register for digital banking services and provide data, which may be linked to corresponding ones of users 108, 110, and/or 112, and stored as customer data within data repository 144. The stored customer data may, for example, include personal information, government-issued identifiers, employment information, and contact information. The stored customer data may also include authentication credentials associated with registered users of the financial institution (e.g., a user name, a user-specified password, a system-generated password, an alphanumeric identification number (e.g., a PIN number) specified by the users or assigned by system 140, biometric information, and information facilitating enhanced authentication techniques).

In additional aspects, and as described above, data repositories 144, 146, and/or 149 may store a rules engine identifying or more rules that regulate a distribution of the tracked assets, an initiation of one or more transactions involving the tracked assets (e.g., a sale, a transfer in ownership, a use of the tracked assets as collateral in a secured transaction etc.), and further, any additional or alternate action involving the tracked assets and/or the hybrid public-private ledger (e.g., processes that generate additional cryptographic key sets for users 108, 110, and/or 112, processes that recover assets racked in the hybrid public-private ledger, etc.). Further, and as described above, data repositories 144, 146, and/or 149 may also store information identifying an event triggers list that identifies causal relationships established by systems 140, 141, and/or 142 between one or more of the established rules and one or more events that trigger an initiation of one or more corresponding regulated distributions, transactions, and/or assets tracked within the hybrid blockchain ledger (e.g., "triggering events").

In some aspects, systems 140, 141, and/or 142 may be configured to establish one or more of the rules, and further, one or more of the causal relationships and triggering events, based on one or more internal regulations associated with corresponding ones of business entities 150 and 151 and governmental entity 152. In other aspects, systems 140, 141, and/or 142 may be configured to establish one or more of the rules and/or triggering events based on information received from one or more of users 108, 110, and/or 112 (e.g., as input provided to a web page or other graphical user interface (GUI) presented by client devices 102, 104, and/or 106 and provided to systems 140, 141, and/or 142).

In an embodiment, data repositories 144, 146, and/or 149 may also store a copy of a master key and private crypto keys associated with users 108, 110, and 112 (and additionally or alternatively, additional private crypto keys associated with other users). By way of example, system 140 may be configured to store the private crypto keys in a data structure that includes information that associates the private crypto keys with corresponding ones of user 108, 110, and 112, and further, may be configured to store the master key in a data structure within data repository 144 that is inaccessible to users 108, 110, and/or 112 (and additionally or alternatively, to other users). Further, in some aspects, data repository 144 may be configured to store the rules engine and/or event triggers list in raw, unencrypted form. In other aspects, consistent with the disclosed embodiments, data repository 144 may be configured to store the rules engine and/or event triggers in encrypted form (e.g., using the stored master key), and/or store a hashed representation of the rules engine and/or the event triggers list. Systems 141 and 145 may be configured to store the private crypto keys, master key, rules engine, and/or event triggers within corresponding ones of data repositories 146 and 149 in a manner similar to that described above.

d. Exemplary Communications Networks

Communications network 120 may include one or more communication networks or medium of digital data communication. Examples of communication network 120 include a local area network ("LAN"), a wireless LAN, a RF network, a Near Field Communication (NFC) network, (e.g., a "WiFi" network), a wireless Metropolitan Area Network (MAN) connecting multiple wireless LANs, NFC communication link(s), and a wide area network ("WAN"), e.g., the Internet. Consistent with embodiments of the present disclosure, communications network 120 may include the Internet and any publicly accessible network or networks interconnected via one or more communication protocols, including, but not limited to, hypertext transfer protocol (HTTP) and transmission control protocol/internet protocol (TCP/IP). Communications protocols consistent with the disclosed embodiments also include protocols facilitating data transfer using radio frequency identification (RFID) communications and/or NFC. Moreover, communications network 120 may also include one or more mobile device networks, such as a GSM network or a PCS network, allowing client device 104 to send and receive data via applicable communications protocols, including those described herein.

e. Exemplary Peer Systems

Referring back to FIG. 1, peer systems 160 may include one or more computing systems configured to execute software instructions to perform one or more operations consistent with disclosed embodiments. In some aspects, peer systems 160 may include computing components configured to store, maintain, and generate data and software instructions. For example, each of peer systems 160 may include one or more computing devices (e.g., a server, network computer, or mainframe computer) having one or more processors that may be selectively activated or reconfigured by executable instructions (e.g., computer programs) stored in one or more tangible, non-transitory computer-readable storage devices.

In an embodiment, one or more of peer system 160 may be configured to receive, from client device 104 across network 120, information associated with a distribution of, transaction involving, or other action associated with one or more assets tracked within hybrid blockchain ledgers consistent with the disclosed embodiments. By way of example, the received information may include, but is not limited to, data identifying at least a portion of the tracked assets, data identifying a current owner of the portion of the tracked assets (e.g., user 110) (or a obfuscated owner identifier), and further, encrypted copies of and/or hash values representative of the rules engine and event triggers list.

In some aspects, the one or more of peer systems 160 may be configured (e.g., by the executed software programs) to validate the received information and to generate a new block of the hybrid blockchain ledger that includes the received information, either alone (e.g., using a "one transaction, one block" paradigm) or in combination with information identifying additional distributions, transactions, or other actions associated with one or more tracked assets (e.g., as a multiple-transaction block). The one or more of peer systems 160 may be further configured to generate one or more hashes representative of the new block, which may be appended to a prior version of the hybrid private-public ledger along with the newly generated block. In some aspects, the one or more of peer system 160 may maintain the updated versions of the hybrid private-public ledger (i.e., the latest, longest hybrid private-public ledger), and may provide the updated version of the hybrid private-public ledger to client devices 102, 104, and/or 106 (and additionally or alternatively, other client devices associated with other users) upon receipt of a request across network 120 and/or at regular or predetermined intervals.

In certain instances, and in addition to a connection with network 120, peer systems 160 may be interconnected across a peer-to-peer network (not depicted in FIG. 1) using any of the wired or wireless communications protocols outlined above. Further, in some instances, one or more of peer systems 160 may function as a "miner," where any miner may be compensated in units of a virtual currency (e.g., Bitcoin™) for validating the received data and for generating updated versions of the hybrid blockchain ledger.

II. Exemplary Processes for Tracking Assets Using Hybrid Blockchain Ledgers

In some embodiments, client devices 102, 104, and/or 106 may execute one or more stored applications that enable corresponding users to track, in conjunction with peer systems 150 and other components of computing environment 100, a disposition and distribution of one or more assets using conventional, publicly available and transparent blockchain ledgers. In some aspects, the use of public blockchain ledgers to track ownership, disposition, and distribution of actual and/or virtual assets (e.g., unit of virtual currencies, such as Bitcoin™, unit of other financial instruments and securities, physical assets, etc.) may present advantages over existing rules server systems, such as those provided by financial institutions that leverage private ledgers.

a. Asset Tracking Using Conventional Blockchain Ledgers

Figure 2:
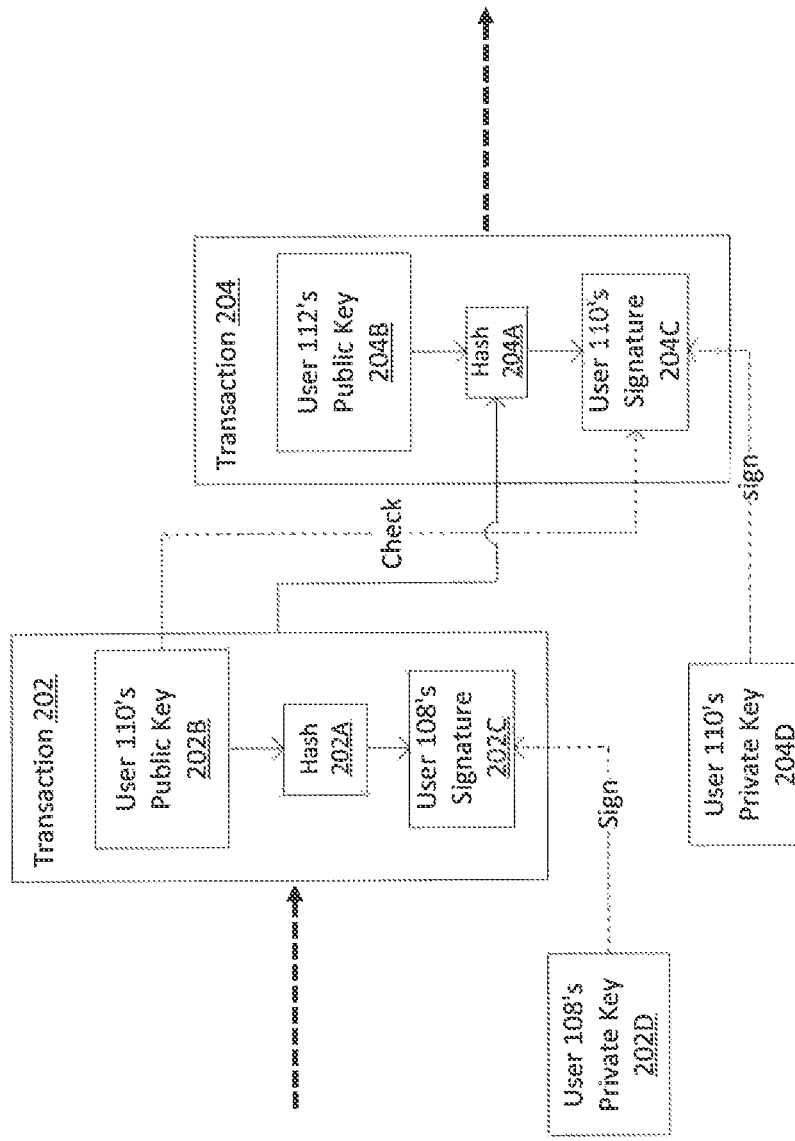
FIG. 2 is a schematic diagram illustrating a conventional blockchain ledger architecture.

FIG. 2 is a schematic diagram of an exemplary structure 200 of a conventional blockchain ledger, which may be generated through the interaction of components of computing environment 100. For example, as described in reference to FIG. 2, a user (e.g., user 110) may be associated with a device (e.g., client device 104) that executes a stored software application (e.g., a wallet application) capable of obtaining a current version of a conventional blockchain ledger from one or more networked computer systems (e.g., one of peer systems 160 configured to "mine" broadcasted transaction data and update ledgers). In some aspects, the current version of a conventional blockchain ledger may represent a "longest" blockchain ledger than includes a maximum number of discrete "blocks," which may identify transactions that transfer, distribute, etc., portions of tracked assets among various owners, including user 110.

For example, client device 104 may obtain the current blockchain ledger, and may process the block chain ledger to determine that a prior owner (e.g., user 108) transferred ownership of a portion of the tracked assets to user 110 in a corresponding transaction (e.g., transaction 202, schematically illustrated in FIG. 2). As described above, one or more of peer systems 160 may have previously data verified, processed, and packed associated with transaction 202 may be into a corresponding block of the conventional blockchain using any of the exemplary techniques described above and/or apparent to one of ordinary skill in the art.

In some aspects, as illustrated in FIG. 2, transaction 202 may include input data that references one or more prior transactions (e.g., transactions that transferred ownership of the tracked asset portion to user 108), and further, output data that includes instructions for transferring the tracked asset portion to one or more additional owners (e.g., user 110). For example, input data consistent with the disclosed embodiments may include, but is not limited to, a cryptographic hash of the one or more prior transactions (e.g., hash 202A) and the set of rules and triggers associated with the assets while the output data consistent with the disclosed embodiments may include, but is not limited to, a quantity or number of units of the tracked asset portion that are subject to transfer in transaction 202 and a public key of the recipient (e.g., public key 202B of user 110).

Further, in some aspects, the transaction data may include a digital signature 202C of user 108 (e.g., the prior owner), which may be applied to hash 202A and public key 202B using a private key 202D of user 108 through any of a number of techniques apparent to one of skill in the art and appropriate to the conventional blockchain ledger architecture. By way of example, the presence of user 108's public key within transaction data included within the conventional blockchain ledger may enable client device 104 and/or peer systems 160 to verify user 108's digital signature, as applied to data associated with transaction 202.

In an embodiment, user 110 may elect to further transfer the tracked asset portion to an additional user (e.g., user 112). For example, as described above, client device 104 may execute one or more software applications (e.g., wallet applications) that generate input and output data specifying a transaction (e.g., transaction '204 of FIG. 2) that transfers ownership of the tracked asset portion from user 110 to user 112, and further, that transmit the generated data to one or more of peer systems 160 for verification, processing (e.g., additional cryptographic hashing) and inclusion into a new block of the clock-chain ledger.

For example, data specifying transaction 204 may include, but is not limited to, a cryptographic hash 204A of prior transaction 202, a quantity or number of units of the tracked asset portion that are subject to transfer in transaction 204, and a public key of the recipient (e.g., public key 204B of user 112). Further, in some aspects, the data specifying transaction 204 may include a digital signature 204C of the user 110, which may be applied to hash 204A and public key 204B using a private key 204D of user 110 using any of the exemplary techniques described above. Further, and by way of example, the presence of user 110's public key 202B within transaction data included within the conventional blockchain ledger may enable various devices and systems (e.g., client devices 106, 106, and/or 108, peer systems 160, etc.) to verify user 110's digital signature 204C, as applied to data specifying transaction 204.

As described above, one or more of peer systems 160 may receive the data specifying transaction 204 from client device 104. In certain instances, peer systems 160 may act as "miners" for the blockchain ledger, and may competitively process the received transaction data (either alone or in conjunction with other data) to generate additional blocks of the ledger, which may be appended to the blockchain ledger and distributed across peer systems 160 (e.g., through a peer-to-peer network) and to other connected devices of environment 100.

In some aspects, conventional blockchain ledger architectures described above may enable the public to review content of the ledgers and verify ownerships. Further, the decentralized nature of conventional blockchain ledgers may also enable multiple distributed networks to verify the contents of a single ledger. The resulting redundancy may render conventional blockchain ledger architecture more robust than centralized server systems, and effectively eliminate the falsification of ledger data by malicious parties.

Despite these advantages, conventional blockchain ledger architectures may exhibit significant flaws when implemented by secured, high-risk systems. By way of example, unencrypted conventional ledger blocks may represent a security concern for transactions of sensitive nature, and further, may represent a privacy concern for members of the general public. For instance, information indicative of an interaction of a prior asset owner and a corresponding device, as present within conventional blockchain ledgers, may represent private information that should not be available to future owners, let alone members of the public.

Further, if an owner were to lose or misplace a corresponding private key, the distributed nature of conventional blockchain ledger architectures, such as those described above, provide little recourse to recover possession of the one or more tracked assets. In certain aspects, the rigidity and inflexibility of these conventional blockchain ledger architectures, and their inability to adapt to changing circumstances (e.g., loss of private keys, theft of tracked assets due to fraudulent or malicious activity), often results in volatility in the usage of the tracked assets and an erosion in a public trust of conventional blockchain ledgers.

Thus, there is a need for improved systems and methods that not only enhance the security of blockchain ledger architectures for use high-risk, sensitive applications, but that also provide a framework that provides owners or holders of assets tracked by blockchain ledger architectures with recourse in an event of fraud or malicious activity, while maintaining the public availability and verification characteristic of blockchain ledgers.

b. Exemplary Hybrid Public-Private Blockchain Ledger Architectures

The disclosed embodiments address these and other problems associated with conventional block-ledger architectures in a technical manner, by providing computer-implemented systems and methods that augment a conventional blockchain ledger with a private-master encryption key architecture that, in conjunction with an owner's pair of public and private blockchain keys, selectively encrypt ledger data to protect both a privacy of owners of tracked assets and a confidentiality of existing instruction sets maintained within the blockchain ledger.

Further, by incorporating an encrypted rules engine and corresponding list of triggering events (e.g., an event triggers list) into each block of the conventional blockchain ledger architecture (and thus generating a hybrid, public-private blockchain architecture), computer-implemented systems and methods consistent with the disclosed embodiments may perform operations that provide owners or holders tracked assets with recovery options in an event of fraud or malicious activity, while maintaining the public availability and verification characteristic of conventional blockchain ledgers.

In certain aspects, discrete data blocks of the conventional blockchain ledgers (e.g., as outlined above in reference to FIG. 2) and of the hybrid blockchain ledgers (e.g., as described in reference to FIG. 3) may include common elements of data that may specify transactions that distribute, transfer, and/or otherwise act upon portions of tracked assets. For example, these common data elements may include, but are not limited to, input data that references one or more prior transactions (e.g., a cryptographic hash of the one or more prior transactions), output data that includes instructions for transferring the tracked asset portion to one or more additional owners (e.g., a quantity or number of units of the tracked asset portion that are subject to the transaction and a public key of the recipient) and further, a digital signature applied to the input and/or output data using a corresponding public key of a current owner of the tracked asset portion. The disclosed embodiments are, however, not limited to exemplary transactions that include a transfer of tracked assets and to the exemplary data elements described above, and in further embodiments, discrete blocks of the hybrid blockchain ledgers may represent any additional or alternate transaction appropriate to the tracked assets, and further, any additional or alternate data appropriate to the tracked assets and to the transaction.

In contrast to the conventional blockchain ledgers described above, the disclosed embodiments may establish a "rules authority" capable of vetting real-time transactions (e.g., distributions, transfers, and/or other actions) involving portions of assets tracked within the exemplary hybrid blockchain ledger architectures described herein, and further, of establishing and maintaining rules (e.g., through a rules engine and corresponding list of triggering events) that facilitate regulatory-based, policy-based, and customer-specified controls of transactions involving the tracked assets (e.g., units of virtual currency, etc.).

For example, and as described above, business entity 150 may represent the rules authority, and one or more computing components of system 150 may perform operations that establish the rules engine and the list of triggering events, which may be stored within a secure data repository (e.g., data repository 144). In some aspects, the generated and stored rules engine may identify or more rules that regulate a distribution of the tracked assets, an initiation of one or more transactions involving the tracked assets (e.g., a sale, a use of the tracked assets as collateral in a secured transaction etc.), and further, any additional or alternate action involving the tracked assets and/or the hybrid public-private ledger (e.g., processes that generate additional cryptographic key sets for user 110, processes that recover assets racked in the hybrid public-private ledger, etc.). Further, and as described above, the generated and stored list of triggering events may include information that specifies causal relationships between one or more of the established rules and one or more events that trigger an initiation of one or more corresponding regulated distributions, transactions, and/or actions associated with assets tracked within the hybrid public-private ledger (e.g., the triggering events).

In some aspects, system 140 may establish one or more of the rules and/or triggering events to reflect regulations and/or policies promulgated by governmental entity, a financial regulator, and/or the rules authority. For example, system 140 may establish a loss of a private key by user 110 as a "triggering event" that would cause system 140 to perform operations that create a new transaction and generate a new pair of public and private blockchain keys for user 110 in response to a verification of particular authentication credentials. In other aspects, system 140 may establish one or more of the rules and/or triggering events based on information received from user 110 (e.g., as input provided to a web page or other graphical user interface (GUI) presented by client device 104 and provided to system 140). For example, user 110 may specify a particular distribution of tracked assets (e.g., recurring bill payments, distributions to other owners, etc.) in response to an accident involving user 110 and/or user 110's death (e.g., triggering events).

In further contrast to the conventional blockchain ledgers described above, one or more computing components of system 140 (e.g., server 142 upon execution of stored instructions) may generate additional cryptographic keys that facilitate the exemplary regulation of transactions (e.g., distributions, transfers, and/or actions) involving assets tracked within the hybrid public-private ledger. By way of example, system 140 may generate a master cryptographic key with which system 140 may encrypt the generated and stored rules engine. In some aspects, certain aspects, system 140 may store copies of the generated master key in a portion of data repository 144 that is not accessible to user 110 (and any other users), thus maintaining a confidence of the generated master key.

System 140 may also perform operations that encrypt the generated list of triggering events, either alone or in conjunction with metadata identifying the rules authority and/or information facilitating a processing of the transaction blocks throughout the hybrid blockchain ledger. In certain aspects, system 140 may also perform operations that generate and maintain additional private cryptographic keys (e.g., a private "crypto" key) associated with each owner associated with the assets tracked within the hybrid blockchain ledger (e.g., users 108, 110, and/or 112) and further, that would enable the owners to decrypt and access the list of triggering events and additionally or alternatively, the metadata identifying the rules authority. System 140 may store copies of the generated private crypto keys in a portion of data repository 144. Furthermore, system 140 may also perform operations that provide corresponding ones of the private crypto keys to users 108, 110, and/or 112 through secure, non-accessible and/or out-of-band communications.

The disclosed embodiments may also be configured to communicate the encrypted and/or hashed rules engine and list of triggering events to owners of and/or user associated with the tracked assets through "in-band" communication processes, such as through an incorporation of the encrypted rules engine and list of triggering events into the transaction blocks of the hybrid blockchain ledger. For example, system 140 may perform operations that hash the encrypted rules engine and list of triggering events into a genesis block of the hybrid blockchain ledger, the contents of which may be incorporated (e.g., by client devices 102, 104, and/or 106, peer systems 160, etc.) into each of the subsequent transaction blocks generated and appended to the hybrid blockchain ledger. In some aspects, by incorporating the hashed and encrypted rules engine and list of triggering events into blocks of the hybrid blockchain ledger, the disclosed embodiments may ensure that the established rules are followed even in an event of actions by malicious parties to disrupt the tracked assets (e.g., instances of Bitcoin™ peeling, etc.)

Further, in some instances, the additional private crypto keys held by the owners and/or users (e.g., stored in corresponding ones of client devices 102, 104, and/or 106 and accessible to executable application programs) may enable the owners and/or users to access the encrypted list of triggering events maintained within the hybrid blockchain ledger. The owners and/or user may, through corresponding client devices, view the individual events that, when detected by system 140, could cause system 140 to perform operations that recover, authorize, audit, and/or verify the transaction and/or ownership data included within the hybrid blockchain ledger (e.g., associated with corresponding portions of the tracked assets).

In certain aspects, one or more computing components of system 140 may perform operations that modify portions of the stored rules and/or list of triggering events, e.g., in response to changes in regulations and/or policies, in response to additional owner input, etc. In order to access and modify the generated rules engine (and/or the list of triggering events) maintained within the hybrid blockchain ledger, system 140 may leverage the stored master cryptographic key to access and modify the hashed and encrypted rules engine. System 140 may, in certain instances, encrypt and re-hash the modified rules engine and submit the encrypted and hashed modified rules engine to one or more of peer systems 160 for inclusion in a block of the hybrid blockchain ledger. For example, the one or more of peer systems 160 may incorporate the hashed and encrypted modified rules engine into the hybrid blockchain ledger as a special transaction (e.g., a "0" value transaction), such that the hybrid blockchain ledger tracks each change within the modified rules engine.

Figure 3:
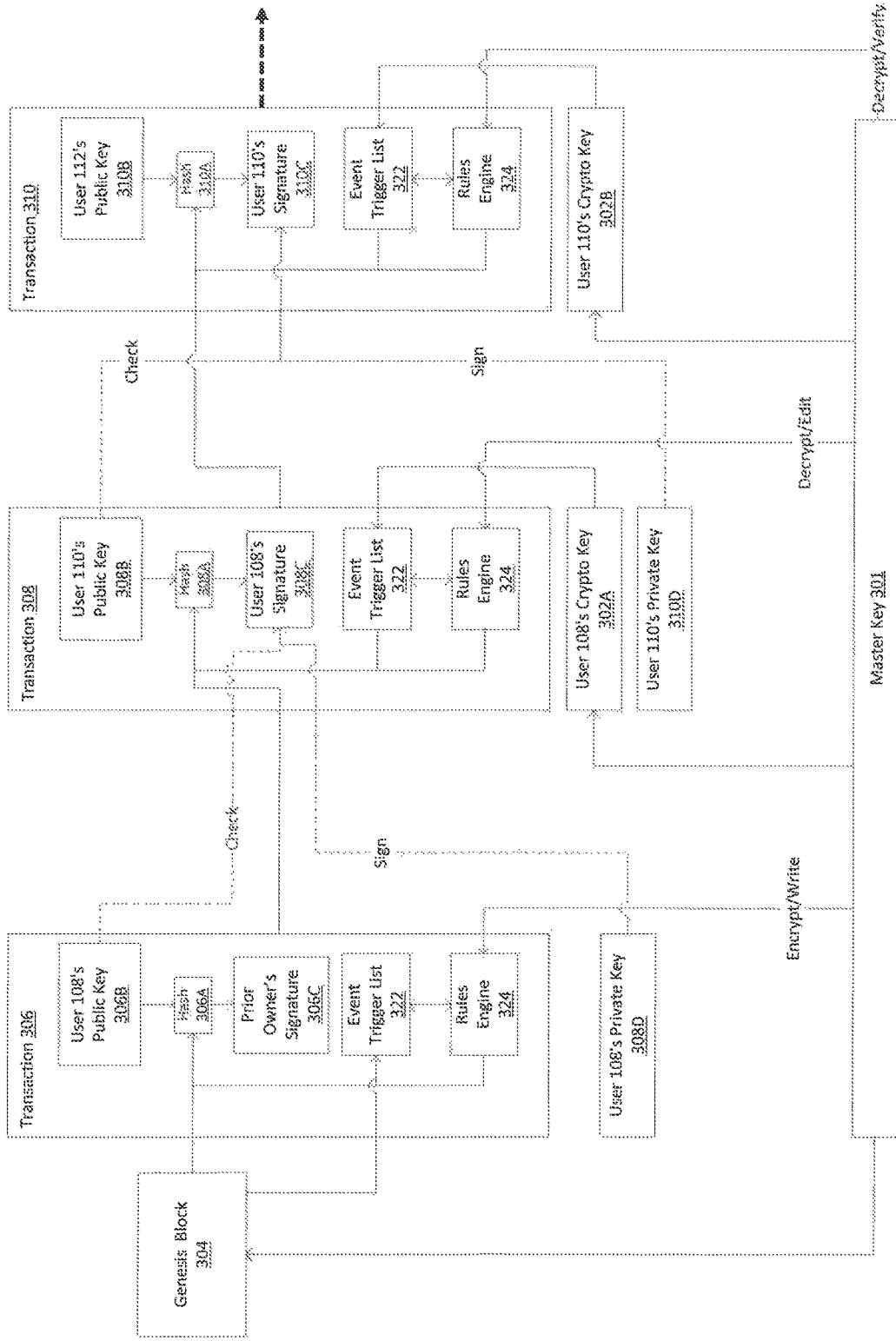
FIG. 3 is a schematic diagram illustrating a hybrid, public-private blockchain ledger architecture, consistent with disclosed embodiments.

FIG. 3 is a schematic diagram of illustrating an exemplary structure 300 of a hybrid, public-private blockchain ledger, which may be generated through the interaction of components of computing environment 100, in accordance with the disclosed embodiments. For example, as described in reference to FIG. 3, users 108, 110, and 112 may be associated with corresponding devices (e.g., client devices 102, 104, and 106), which may be configured to execute one or more stored software applications (e.g., a wallet application) capable of obtaining a current version of a hybrid blockchain ledger from one or more networked computer systems (e.g., one of peer systems 160 configured to "mine" broadcast transactions and update ledgers).

Further, in some aspects, and as described above, a system associated with a rules authority (e.g., system 140 associated with business entity 150) may generate a rules engine that regulate transactions involving the assets tracked by the hybrid blockchain ledger (e.g., distributions, transfers of ownership, other actions, etc.), and further, a list of triggering events that, upon detection by system 140, trigger an initiation of one or more of the distributions, transfers, and/or other actions regulated by the generated rules engine. In additional aspects, and as described above, system 140 may generate a master encryption key (e.g., master key 301 of FIG. 3), which may be system 140 may maintain in a portion data repository 144, and may generate additional private "crypto" keys 302A and 302B, which may be associated with corresponding ones of users 108 and 110 In some aspects, system 140 may maintain private crypto keys 302A, 302B, and 302C in a portion of data repository 144 and provide private crypto keys 302A, 302B, and 302C to users 108, 110, and 112 through secure, out-of-band communications. System 140 may, in additional aspects, encrypt the generated rules engine and the generated list of triggering events, and further, perform operations that hash the encrypted rules engine and list of triggering events into a genesis block of the hybrid blockchain ledger (e.g., genesis block 304).

In an embodiment, one of the users (e.g., user 108) may own and/or control a portion of the tracked assets. For example, a device associated with user 108 (e.g., client device 102) may execute a stored software application (e.g., a wallet application) capable of obtaining a current version of a hybrid blockchain ledger, including genesis block 304, from one or more networked computer systems (e.g., one of peer systems 160 configured to "mine" broadcast transactions and update ledgers). In some aspects, the current version of a hybrid blockchain ledger may represent a "longest" blockchain ledger than includes a maximum number of discrete "blocks," which may identify transactions that transfer, distribute, etc., portions of tracked assets among various owners, including user 108.

For example, client device 102 may obtain the current hybrid blockchain ledger, and may process the hybrid blockchain ledger to determine that a prior owner transferred ownership of a portion of the tracked assets to user 108 in a corresponding transaction (e.g., transaction 306, schematically illustrated in FIG. 3). As described above, one or more of peer systems 160 may have previously data verified, processed, and packed data associated with transaction 306, which may be into a corresponding block of the conventional blockchain using any of the exemplary techniques described above and/or apparent to one of ordinary skill in the art.

In some aspects, as illustrated in FIG. 3, data specifying transaction 306 may include input data that references one or more prior transactions (e.g., transactions that transferred ownership of the tracked asset portion to the prior owner), and further, output data that includes instructions for transferring the tracked asset portion to user 108. For example, and as described above, input data consistent with the disclosed embodiments may include, but is not limited to, a cryptographic hash of the one or more prior transactions (e.g., hash 306A), and output data consistent with the disclosed embodiments may include, but is not limited to, a quantity or number of units of the tracked asset portion that are subject to transfer in transaction 302 and a public key 306B of user 108 (i.e., the recipient of the tracked asset portion transferred in transaction 306). Further, in some aspects, the transaction data may include a digital signature 306C of the prior owner, which may be applied to hash 306A and public key 306B using a private key of the prior owner through any of a number of techniques apparent to one of skill in the art and appropriate to the conventional blockchain ledger architecture.

Further, and in contrast to the conventional blockchain ledger architectures described above, transaction 306 may also include encrypted and/or hashed copies of rules engine 320 and trigger event list 322. In certain aspects, a device of the prior owner (e.g., which may execute one or more software applications) may access genesis block 304 (e.g., from the current version of the hybrid blockchain ledger obtained from one or more of peer systems 160), may parse genesis block 306, and may extract copies of the encrypted and/or hashed rules engine 322 and trigger event list 324. The prior owner's device may transmit to one or more of peer systems 160 along with the hash 306A, public key 306B, and digital signature 306C for verification, processing (e.g., additional cryptographic hashing) and inclusion into a new block of the hybrid blockchain ledger.

In an embodiment, user 108 may elect to further transfer that tracked asset portion to an additional user (e.g., user 110). For example, as described above, the one or more software applications executed by client device 102 may cause client device 102 to perform operations that generate input and output data specifying a new transaction (e.g., transaction 308 of FIG. 3) that transfers ownership of the tracked asset portion from user 108 to user 110, and further, that transmit the generated data to one or more of peer systems 160 for verification, processing (e.g., additional cryptographic hashing) and inclusion into a new block of the hybrid blockchain ledger.

For example, data specifying transaction 308 may include, but is not limited to, a cryptographic hash 308A of prior transaction 306, a quantity or number of units of the tracked asset portion that are subject to transfer in transaction 308, and a public key of the recipient (e.g., public key 308B of user 110). Further, in some aspects, the data specifying transaction 308 may include a digital signature 308C of the user 108, which may be applied to hash 308A and public key 308B using a private key 308D of user 108 using any of the exemplary techniques described above. Further, and by way of example, the presence of user 108's public key within transaction data included within the conventional blockchain ledger may enable various devices and systems (e.g., client devices 102, 104, and/or 106, peer systems 160, etc.) to verify the user 108's digital signature 308D, as applied to data specifying transaction 308.

Additionally, and as described above, client device 102 may also parse data specifying prior transaction 306 (e.g., as obtained from the current version of the hybrid blockchain ledger) and extract encrypted and/or hashed copies of rules engine 322 and trigger event list 324. In certain aspects, client device 102 may append the encrypted and/or hashed copies of rules engine 322 and trigger event list 324 to the data specifying transaction 308 (e.g., cryptographic hash 308A, public key 308B, and digital signature 308C), and transmit the data specifying transaction 308B to one or more of peer systems 160 for verification, processing (e.g., additional cryptographic hashing) and inclusion into a new block of the hybrid blockchain ledger.

Further, and as described above, private crypto key 302A may enable client device 102 (e.g., associated with user 108) to access encrypted event trigger list 322 upon extracted from the hybrid blockchain ledger, as described above. In some embodiments, private crypto key 302A may provide client device 102 with read-only access to the encrypted event trigger list 322. In some aspects, client device 102 may obtain private crypto key 302A from system 140 using secured out-of-band communications, and additionally or alternatively, as input provided by user 108 through a web page or other graphical user interface (GUI) presented by client device 104.

In an embodiment, ownership of the tracked asset portion may be transferred from user 108 to user 110 upon verification and publication of the data specifying transaction 308 within a corresponding block of the hybrid blockchain ledger by peer systems 160. In further embodiments, and as described above, user 110 may elect to further transfer that tracked asset portion to yet another user (e.g., user 112). For example, as described above, the one or more software applications executed by client device 104 may cause client device 104 to perform operations that generate input and output data specifying a new transaction (e.g., transaction 310 of FIG. 3) that transfers ownership of the tracked asset portion from user 110 to user 112, and further, that transmit the generated data to one or more of peer systems 160 for verification, processing (e.g., additional cryptographic hashing) and inclusion into a new block of the hybrid blockchain ledger.

For example, data specifying transaction 310 may include, but is not limited to, a cryptographic hash 310A of prior transaction 308, a quantity or number of units of the tracked asset portion that are subject to transfer in transaction 310, and a public key 310B of user 112. Further, in some aspects, the data specifying transaction 310 may include a digital signature 310C of the user 110, which may be applied to hash 310A and public key 310B using a private key 310D of user 110, as described above. Additionally, and by way of example, the presence of user 110's public key 308B within transaction data included within the hybrid blockchain ledger may enable various devices and systems (e.g., client devices 102, 104, and/or 106, peer systems 160, etc.) to verify the user 110's digital signature 310C, as applied to data specifying transaction 310.

Additionally, and as described above, client device 104 may also parse data specifying prior transaction 308 (e.g., as obtained from the current version of the hybrid blockchain ledger) and extract encrypted and/or hashed copies of rules engine 322 and trigger event list 324. In certain aspects, client device 104 may append the encrypted and/or hashed copies of rules engine 322 and trigger event list 324 to the data specifying transaction 310 (e.g., cryptographic hash 310A, public key 310B, and digital signature 310C), and transmit the data specifying transaction 310 to one or more of peer systems 160 for verification, processing (e.g., additional cryptographic hashing) and inclusion into a new block of the hybrid blockchain ledger. In an embodiment, ownership of the tracked asset portion may be transferred from user 110 to user 112 upon verification and publication of the data specifying transaction 310 within a corresponding block of the hybrid blockchain ledger by peer systems 160.

Further, and as described above, private crypto key 302B may enable client device 104 (e.g., associated with user 110) to decrypt event trigger list 322 upon extraction from the hybrid blockchain ledger, as described above. In some aspects, client device 104 may obtain private crypto key 302B from system 140 using secured out-of-band communications, and additionally or alternatively, as input provided by user 110 through a web page or other graphical user interface (GUI) presented by client device 104. In other aspects, client device 104 may identify and extract private crypto key 302B from a portion of the hybrid blockchain ledger obtained from peer systems 160 (e.g., as a secure in-band communication).

In the embodiments described above, system 140 may establish and maintain rules (e.g., through a rules engine and corresponding list of triggering events) that facilitate regulatory-based, policy-based, and customer-specified controls of transactions involving assets tracked within a hybrid blockchain ledger. For example, client devices 102, 104, and/or 106 may generate transaction data that includes and rules engine and list of triggering events, and one or more of peer systems 160 may embed the generated transaction data into blocks of the hybrid blockchain ledger for reference in subsequent transactions. Further, in certain aspects, system 140 may be configured to detect an occurrence of an event (e.g., based on data received from client devices 102, 104, and/or 106, etc.), may determine whether the list of triggering events includes the detected event, and when triggering event list includes the detected event, perform one or more operations consistent with an established rule that references the detected event, as described below in reference to FIG. 4.

Figure 4:
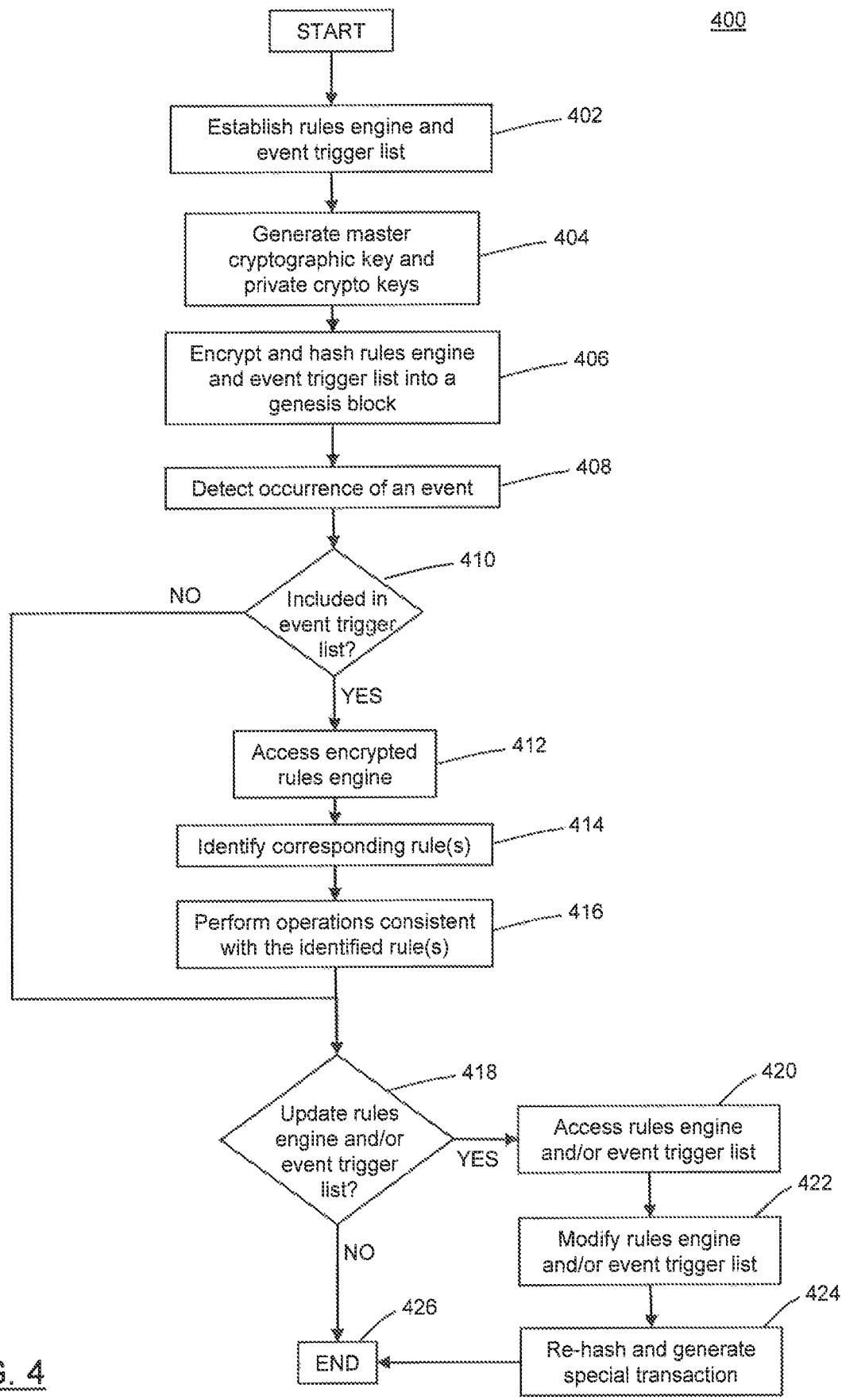
FIG. 4 is a flowchart of an exemplary process for performing operations in response to events tracked within a hybrid blockchain ledger, consistent with the disclosed embodiments.

FIG. 4 is a flowchart of an exemplary process 400 for automatically performing event-based operations on assets tracked within a hybrid blockchain ledger in accordance with disclosed embodiments. In an embodiment, a rules authority may be assigned to establish regulatory-based, policy-based, and customer-specified control over assets tracked within the hybrid blockchain ledger. In some aspects, tracked assets consistent with the disclosed embodiments may include, but are not limited to, units of a virtual currency or a crypto-currency, units of financial instruments held by one or more owners, and physical assets utilized by one or more individuals and/or entities. In some aspects, a computer system associated with the rules authority (e.g., system 140 associated with business entity 150) may execute one more stored application programs to cause system 140 to recover, authorize, audit, and/or verify an ownership of at least a portion of the tracked assets and/or transactions involving he tracked assets based on established and maintained rules.

In one aspect, one or more computing components of system 140 may generate a rules engine and a list of triggering events, which may be stored within a portion of data repository 144 (e.g., in step 402). For example, the generated and stored rules engine may identify or more rules that regulate a distribution of the tracked assets, an initiation of one or more transactions involving the tracked assets (e.g., a sale, a use of the tracked assets as collateral in a secured transaction etc.), and further, any additional or alternate action involving the tracked assets and/or the hybrid public-private ledger (e.g., processes that generate additional cryptographic key sets for user 110, processes that recover assets tracked in the hybrid public-private ledger, etc.). Further, and as described above, the generated and stored list of triggering events may include information that specifies causal relationships between one or more of the established rules and one or more events that trigger an initiation of one or more corresponding regulated distributions, transfers, and/or actions involving assets tracked within the hybrid public-private ledger (e.g., the triggering events).

In certain instances, system 140 may establish, in step 402, one or more of the rules and/or triggering events to reflect regulations and/or policies promulgated by governmental entity, a financial regulator, and/or the rules authority. For example, system 140 may establish a loss of a private key by user 110 as a "triggering event" that would cause system 140 to perform operations that generate a new pair of public and private blockchain keys for user 110 in response to a verification of particular authentication credentials. Further, and by way of example, system 140 may deem a documented theft of a portion of the tracked assets a "triggering event" that would cause system 140 to perform operations recover the stolen portion of the tracked assets and generate a new pair of public and private blockchain keys for user 110.

In other instances, system 140 may establish, in step 402, one or more of the rules and/or triggering events based on information received from user 110 (e.g., as input provided to a web page or other graphical user interface (GUI) presented by client device 104 and provided to system 140). For example, user 110 may specify a particular distribution of tracked assets (e.g., recurring bill payments, etc.) in response to an accident involving user 110 and/or user 110's death (e.g., triggering events). The disclosed embodiments are, however, not limited to these exemplary triggering events and corresponding rules, and in further embodiments, system 140 may establish any additional or alternate rules and/or triggering events appropriate to the tracked assets, to business entity 150, and further, to users 108, 110, and 112.

Further, one or more computing components of system 140 may generate additional cryptographic keys that facilitate the exemplary regulation of transactions (e.g., distributions, transfers, and/or actions) involving assets tracked within the hybrid public-private ledger (e.g., in step 404). By way of example, in step 404, system 140 may generate a master cryptographic key with which system 140 may encrypt the generated and stored rules engine, as described above. In some aspects, certain aspects, system 140 may store copies of the generated master key in a portion of data repository 144 that is not accessible to user 110 (and any other users), thus maintaining a confidence of the generated master key.

Further, in step 404, system 140 may also perform operations that generate and maintain additional private cryptographic keys (e.g., private "crypto" keys) associated with each owner of the assets tracked within the hybrid blockchain ledger. As described above, the generated private crypto keys may enable a device of each of owner to decrypt and access the list of triggering events and additionally or alternatively, metadata identifying the rules authority. System 140 may store copies of the generated private crypto keys in a portion of data repository 144. Furthermore, system 140 may also perform operations that provide corresponding ones of the private crypto keys to users 108, 110, and/or 112 through secure, non-accessible and/or out-of-band communications.

In step 406, system 140 may perform operations that encrypt the generated and stored rules engine (e.g., using the master encryption key) and further, that encrypt the generated and stored list of triggering events (e.g., using any of the exemplary techniques described above that facilitate decryption using the private crypto keys). For example, system 140 may perform operations in step 406 that hash the encrypted rules engine and list of triggering events into a genesis block of the hybrid blockchain ledger, the contents of which may be incorporated (e.g., by client devices 102, 104, and/or 106, peer systems 160, etc.) into each of the subsequent transaction blocks generated and appended to the hybrid blockchain ledger. In some aspects, by incorporating the hashed and encrypted rules engine and list of triggering events into the blocks of the hybrid blockchain ledger, the disclosed embodiments may ensure that the established rules are followed even in an event of actions by malicious parties that disrupt the tracked assets (e.g., instances of Bitcoin™ peeling, etc.).

Further, in some embodiments, one or more computing components of system 140 may detect an occurrence of an event involving a portion of the tracked assets, an owner of a portion of the tracked assets, and/or a transaction involving a portion of the detected assets (e.g., in step 408). For example, system 140 may receive data from client device 104 that indicates user 110 lost a corresponding private blockchain key associated with a portion of the tracked assets. In other instances, system 140 may detect an event in step 140 based on data received across network 120 from one or more systems associated with local, state, and/or federal governmental entities (e.g., data from a law enforcement system notifying business entity 150 of a theft of a portion of the tracked assets, data from a local government confirming a death of an owner of a portion of the tracked assets, etc.). Further, in additional instances, system 140 may detect an occurrence of an event based on one or more sensors and devices communicatively connected to network 120 and capable of transmitting data to system 140. The disclosed embodiments are, however, not limited to these exemplary events, and in further embodiments, system 140 may be configured to detect any additional or alternate event appropriate to the tracked assets and to the components of computing environment 100.

System 140 may also be configured to access the stored list of triggering events (e.g., within database 144), and may determine whether the list of triggering events includes the detected event (e.g., in step 410). If system 140 were to identify the detected event within the list of triggering events (e.g., step 410; YES), system 140 may establish the detected event as a triggering event, and may access the encrypted rules engine using the master encryption key (e.g., in step 412). System 140 may further identify, within the accessed rules engine, one or more of the established rules that are causally related to the detected triggering event (e.g., in step 414). Further, in some aspects, system 140 may be configured to perform one or more operations, either individually or in sequence, that are consistent with the identified rules (e.g., in step 416). For example, the accessed rules engine may include information identifying the one or more operations associated with the identified rules. In other instances, at least one of the performed operations may represent a default operation associated with the identified rules (e.g., a specific type of authentication required before performing the one or more operations on behalf of user 110).

In one embodiment, one or more computing components of system 140 may also determine whether to update portions of the generated rules engine and/or list of triggering events (e.g., in step 418). For example, system 140 may identify an update or modification to one or more regulations and/or policies promulgated by governmental entity, a financial regulator, and/or the rules authority. In other instances, system 140 may obtain, from client device 104, information updating a rule and/or triggering event previously established by system 140 based on input received from user 110 (e.g., through a web page and/or GUI presented by client device 104).

If system 140 determines to update portions of the generated rules engine and/or list of triggering events (e.g., step 418; YES), system 140 may access appropriate portions of the rules engine and/or list or triggering events in step 420 (e.g., using the master encryption key and/or any of the exemplary techniques described above), and may modify the appropriate portions of the rules engine and/or list of triggering events to reflect the updated regulations, policies, user-specified rules, and/or user-specified events (e.g., in step 422). In some instances, system 140 may modify the accessed rules engine by adding a new rule, deleting an existing rule, modifying one or more parameters of an existing rule, and/or modifying one or more operations associated with an existing rule. In other instances, system 140 may modify the accessed list of event triggers to add a new triggering event, delete an existing triggering event, and/or add or modify parameters associated with an existing triggering event.

In some aspects, system 140 may encrypt and re-hash the modified rules engine and/or list of triggering events, and may submit the encrypted and hashed modified rules engine and/or list of triggering events to one or more of peer systems 160 for inclusion in a block of the hybrid blockchain ledger (e.g., In step 424). For example, one or more of peer systems 160 may incorporate the hashed and encrypted modified rules engine and/or list of triggering events into the hybrid blockchain ledger as a special transaction (e.g., a "0" value transaction), such that the hybrid blockchain ledger tracks each change within the modified rules engine and/or list of triggering events. Exemplary process 400 is then complete in step 426.

Referring back to step 418, if system 140 were to determine that no modification to the rules engine and/or the list of triggering events is warranted (e.g., step 418; NO), exemplary process 400 may pass forward to step 426, and exemplary process 400 is complete. Further, and in reference to step 410, if system 140 were to determine that the list of triggering events fails to include the detected event (e.g., step 410; NO), exemplary process 400 may pass forward to step 418, and system 140 may determine whether to update portions of the rules engine and/or list of triggering events using any of the exemplary processes described above.

In the embodiments described above, and through the generation of the master cryptographic key and management of the generated rules engine and corresponding list of triggering events, system 140 may perform operations that recover, authorize, audit, and/or verify an ownership of at least a portion of the tracked assets and/or transactions involving the tracked assets. In certain aspects, the operations performed by system 140, which utilize hybrid blockchain ledgers consistent with the disclosed embodiments, would not be possible using the conventional blockchain ledgers described above.

For example, user 110 may be an avid user of a virtual or crypto-currency (e.g., Bitcoin™), user 110 may store a private key (e.g., private key 310D) on a laptop computer (e.g., client device 104) to generate and confirm Bitcoin™ transactions. In one instance, user 110 may unfortunately drop the laptop into a swimming pool while confirming a Bitcoin™ with private key 310D, and upon retrieved from the swimming pool, user 110 may establish that the laptop no longer functions and that data on the laptop is not recoverable.

Through a device in communication with network 120 (e.g., user 110's smartphone), user 110 may access a conventional blockchain ledger, such as those conventional architectures outlined above, and determine that the Bitcoin™ transfer was incomplete when user 110 dropped the laptop into the swimming pool. Further, user 110 may determine that the Bitcoin™ transaction represents an orphaned block within the conventional blockchain ledger, and the Bitcoins™ associated with the orphaned block are unrecoverable and permanently lost.

In other aspects, user 110 may access a hybrid blockchain ledger (e.g., as described above in reference to FIG. 3), and may determine that the Bitcoin™ transfer was incomplete when user 110 dropped the laptop into the swimming pool. In an embodiment, however, user 110 may provide input to the smartphone identifying the unrecoverable private key, which the smartphone may transmit to system 140 across network 120. In some aspects, system 140 may receive the transmitted message (e.g., in step 408), may determine that user 110's loss of private key 310D represents a triggering event (e.g., step 410; YES), and may perform operations that authenticate user 110's identity and that regenerate a pair of private and public blockchain keys for user 110, which system 140 may transmit to user 110 through any of the secure non-accessible processes outlined above (e.g., in steps 412, 414, and 416). Upon receipt of the newly generated private key, user 110 may access the hybrid blockchain ledger (e.g., through the smartphone) and confirm the Bitcoin® transfer to recover the crypto-currency.

Further, and by way of example, user 110 may access a wallet application executed by client device 104, and further, may determine that the mobile wallet is missing a number Bitcoins™. User 110 may suspect that the loss of the Bitcoins™ represents a theft by a malicious entity, and through a complex search of a corresponding blockchain ledger (e.g., conventional blockchain ledgers described above, and/or hybrid blockchain ledgers consistent with the disclosed embodiments), user 110 may trace the theft of the Bitcoins™ to a single transaction within a corresponding block. User 110 may contact the police e-crime unit and report the theft, and the police may confirm the accuracy of user 110's allegations regarding the theft.

User 110 may, in some instances, be capable of processing the conventional blockchain ledgers described above to determine an address of the malicious entity responsible for the theft. The decentralized and anonymous nature of conventional blockchain ledgers may, however, prevent user 110 from identifying the malicious entity, and the stolen Bitcoins™ may remain permanently unrecoverable.

The disclosed embodiments may, however, address the deficiencies of conventional blockchain ledgers and provide user 110 with recourse to recover the stolen Bitcoins™. For example, the police e-crime unit may notify the rules authority of the theft of user 110's Bitcoins™ and destination address associated with the malicious entity (e.g., through a message transmitted to system 140 and received, e.g., in step 408). System 140 may determine that the theft of the Bitcoins™ represents a triggering event included within the generated list (e.g., step 410; YES), and may perform operations that automatically create a request for a new transaction that returns the stolen Bitcoins™ to user 110 using any of the exemplary techniques described above (e.g., in steps 412, 414, and 416). System 140 may also perform operations that regenerate a pair of private and public blockchain keys for user 110, which system 140 may transmit to user 110 through any of the secure non-accessible processes outlined above (e.g., in steps 412, 414, and 416).

The hybrid blockchain ledger architectures described above may add a level of sophistication to conventional mechanisms for trustless communication by allowing transactions involving tracked assets to occur according to common transaction rules. Further, the hybrid blockchain ledger architectures consistent with the disclosed embodiments may allow owners of the tracked assets to project authority over the tracked assets by establishing customized rules for transaction authorization. Furthermore, and in contrast to the conventional techniques described above, the hybrid blockchain ledger architecture may enable a rules authority (e.g., business entity 150 associated with system 140) to recover, authorize, audit, and/or verify an ownership of at least a portion of the tracked assets and/or transactions involving the tracked assets based on established and maintained rules.

In the embodiments described above, and through the generation of a master cryptographic key and management of a generated rules engine and corresponding list of triggering events, system 140, acting as a rules authority, may perform operations that recover, authorize, audit, and/or verify an ownership of at least a portion of the tracked assets and/or transactions involving the tracked assets. In some aspects, and as outlined above, tracked assets consistent with the disclosed embodiments may include, but are not limited to, units of a virtual currency or a crypto-currency, units of financial instruments held by one or more owners, and physical assets utilized by one or more individuals and/or entities.

In additional aspects, the exemplary hybrid blockchain algorithms described above may track a location, performance, usage, and/or status one or more additional client devices (e.g., "connected devices) disposed within computing environment 100 (not shown in FIG. 1), which may be configured to establish communications with client devices 102, 104, and 106, and further, with system 140, using any of the communications protocols outlined above. For example, client device 102, 104, and 106, system 140, and the connected devices may be uniquely identifiable and addressable within communications network 120, and may be capable of transmitting and/or receiving data across the established communications sessions. Further, in some aspects, system 140 may be configured to establish the communications sessions with one or more of the connected devices, and to exchange data with the connected devices autonomously and without input or intervention from a user of client device 104 (e.g., user 110).

In some aspects, the connected devices may be implemented as a processor-based and or computer-based device that includes one or more processors and tangible, computer-readable memories, as described above in reference to client devices 102, 104, and 106. By way of example, connected devices consistent with the disclosed embodiments may include, but are not limited to mobile communications devices (e.g., mobile telephones, smart phones, tablet computers, etc.) and other devices capable of communicating with client device 104 (e.g., internet-ready televisions, internet-ready appliances and lighting fixtures, computing devices disposed within motor vehicles, etc.).

Further, in additional aspects, the connected devices may include sensor devices in communication with the one or more processors and the memories. The sensor devices may, in some aspects, be configured to monitor the usage, location, status, etc., of corresponding ones of the connected devices, and may be configured to provide sensor data to corresponding ones of the processors. In some aspects, the sensor data may include, but is not limited to, data identifying a current state, data specifying intended and/or unintended interaction with one or more of users 108, 110, and/or 112 (e.g., through client devices 102, 104, and/or 106), inadvertent interactions (e.g., drops, other accidental interactions, etc.), and data describing any additional or alternate characteristics of the connected devices capable of being monitored and quantified by the sensor devices.

In other aspects, computing environment 100 may include one or more additional computing systems in communication with the connected devices using any of the communications protocols outlined above. The additional computing system may, in an embodiments, may include one or more sensor devices capable of monitoring a location, performance, usage, and/or status of the connected devices, which may establish a "sensor network" capable of monitoring the connected devices. These additional computing systems may provide the additional sensor data to the connected devices using any of the communications protocols outlined above, either a regular intervals or in response to requests from the connected devices. In some instances, the additional computing systems may be implemented as processor-based and/or computer-based systems consistent with the exemplary systems described above.

In further aspects, the connected devices may be configured to transmit portions of the sensor data (e.g., as detected by on-board sensor devices and/or received from the sensor network) to client devices 102, 104, and/or 106 and additionally or alternatively, to system 140, using any of the communications protocols outlined above. By way of example, the sensor data may characterize and interaction between the connected devices and users 108, 110, and 112 (e.g., the monitored data may represent usage data indicative of a consumption of one or more services provided by the connected devices), and the connected devices and may transmit the usage data for users 108, 110, and/or 112 to corresponding ones of client devices 102, 104, and/or 106, which may store the received usage data in a corresponding data repository. In further aspects, the connected devices may also transmit the usage data to system 140, along with information linking specific elements of the usage data to corresponding users and/or client devices (e.g., user 110's usage data may be linked to an identifier of user 110 and/or of client device 104). In certain aspects, as described below in reference to FIGS. 5 and 6, client devices 102, 104, and/or 108 may also incorporate corresponding portions of the monitored data, e.g., as received from the connected devices, into hybrid blockchain ledgers consistent with the disclosed embodiments in order to record, track, and publicly monitor the location, performance, usage, and/or status of the connected devices.

Figure 5A:
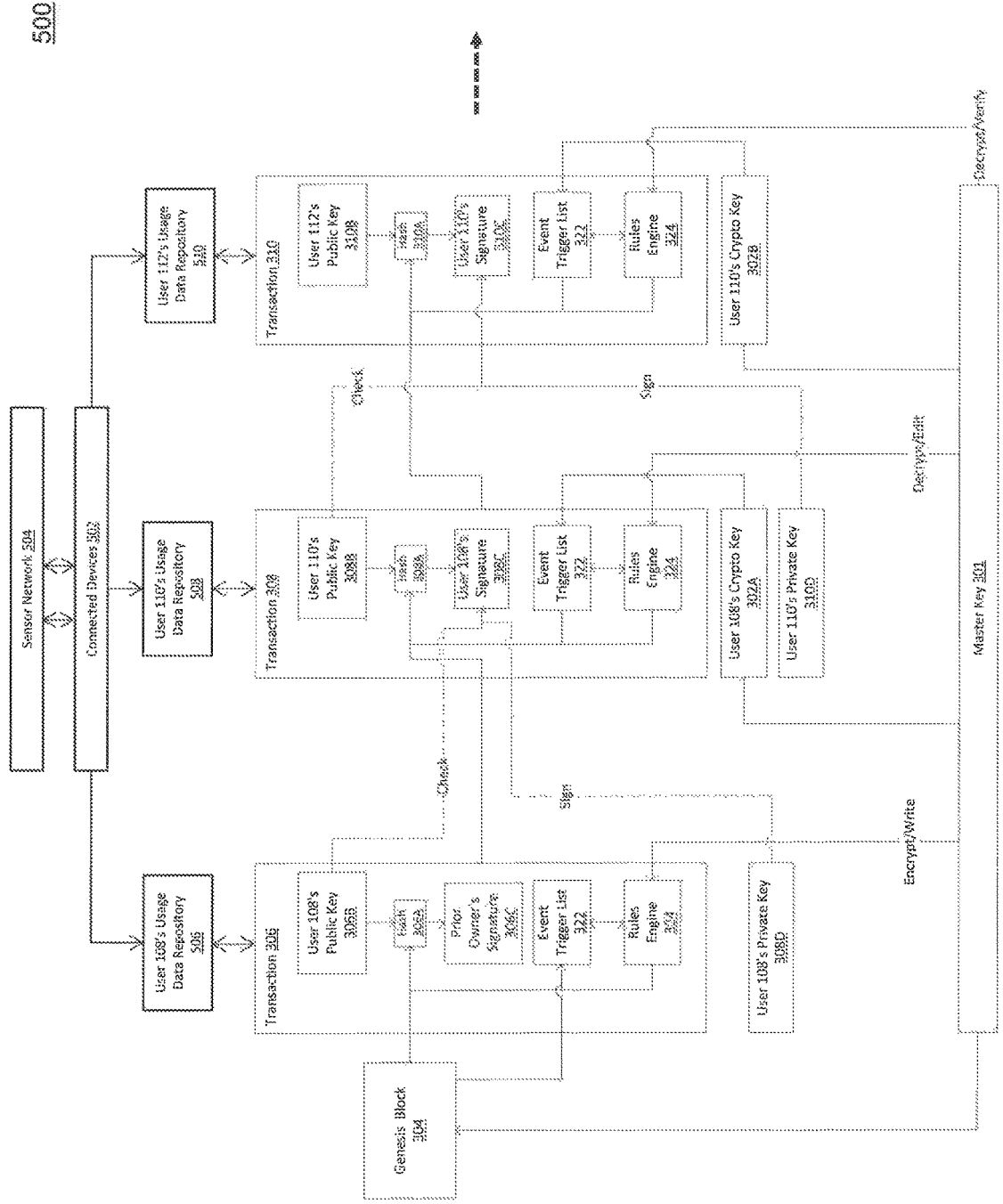
FIGS. 5A, 5B, and 6 are schematic diagrams illustrating additional hybrid, public-private blockchain ledger architectures, consistent with disclosed embodiments.
Figure 5B:
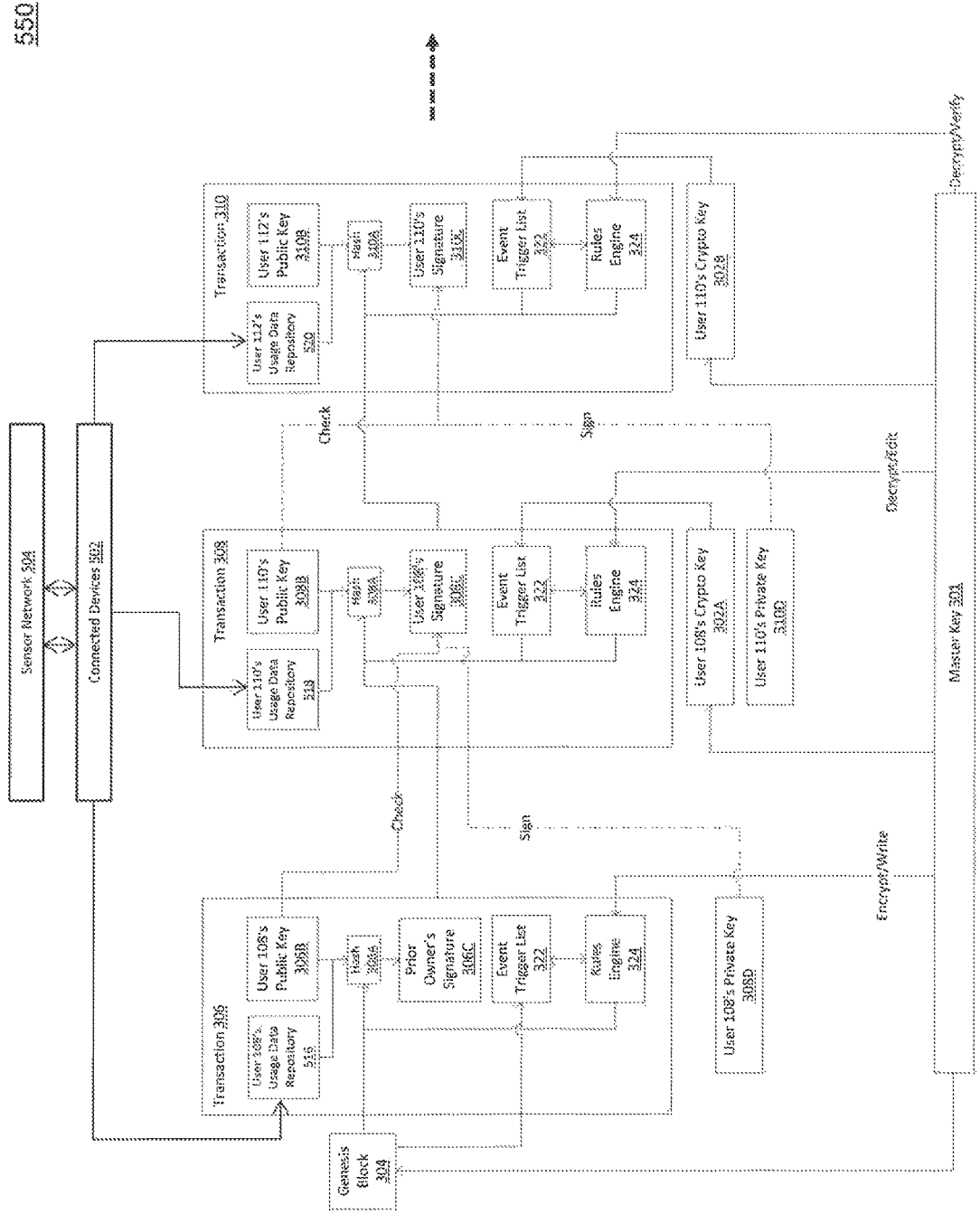

FIG. 5A is a schematic diagram of illustrating an exemplary structure 500 of a hybrid, public-private blockchain ledger, which may be generated through the interaction of components of computing environment 100, in accordance with the disclosed embodiments. For example, as described in reference to FIG. 4, users 108, 110, and 112 may be associated with corresponding devices (e.g., client devices 102, 104, and 106), which may be configured to execute one or more stored software applications (e.g., a wallet application) capable of obtaining a current version of a hybrid blockchain ledger from one or more networked computer systems (e.g., one of peer systems 160 configured to "mine" broadcast transactions and update ledgers).

In some aspects, and as described above, the embodiments described in FIG. 5 may incorporate the exemplary hybrid blockchain ledger described above in reference to FIG. 3 (e.g., hybrid blockchain ledger structure 300), and may augment hybrid blockchain ledger structure 300 to include and track monitored data indicative of a location, performance, usage, and/or status of one or more connected devices 402 disposed within environment 100 and in communication with client devices 102, 104, and 106. For example, and as described above, connected devices 502 may be implemented as processor-based and/or computer-based systems that include one or more processors and corresponding tangible, non-transitory computer-readable memories.

Further, the one or more processors of connected devices 502 may obtain sensor data from one or more on-board sensor devices capable of monitoring connected devices 502 and additionally or alternatively, from one or more external sensor devices disposed within additional computing systems in communication with connected devices 502. The on-board and external sensor devices may, in some aspects, collectively form a sensor network 504 that generates and provides sensor data to the connected devices. For instance, and as described above, the sensor data may include, but is not limited to, data identifying a current state, data specifying intended and/or unintended interaction with one or more of users 108, 110, and/or 112 (e.g., through client devices 102, 104, and/or 106), inadvertent interactions (e.g., drops, other accidental interactions, etc.), and data describing any additional or alternate characteristics of the connected devices capable of being monitored and quantified by the sensor devices. In some aspects, the connected devices may be configured to transmit portions of the received sensor data to corresponding ones of client devices 102, 104, and 106, and to system 140, using any of the communications protocols outlined above (e.g., through peer-to-peer communications, etc.).

For example, the sensor data received by connected devices 502 may specify a usage or a consumption of one or more services of the connected devices by corresponding ones users 108, 110, and 112 (e.g., associated with client devices 102, 104, and 106). In some aspects, portions of the usage data attributable to corresponding ones of users 108, 110, and 112 may be transmitted to corresponding ones of client devices 102, 104, and 106, and further, to system 140. In further aspects, the user-specific portions of the usage data may be stored outside of the hybrid, blockchain data structures and within corresponding user-specific usage data repositories (e.g., usage data repositories 506, 508, and/or 510 of FIG. 5A). In other aspects, illustrated in FIG. 5B, the user-specific portions of the usage data may be stored within the hybrid, blockchain data structures and in decrypted form within corresponding user-specific usage data repositories (e.g., usage data repositories 516, 518, and/or 520 of FIG. 5B).

In some embodiments, as described below in reference to FIG. 6, client devices 102, 104, and/or 106, in conjunction with system 140, may augment the exemplary hybrid blockchain ledger structures described above to include usage data and corresponding metadata. Using the resulting hybrid blockchain ledger, one or more devices and systems operating within environment 10 may monitor the location, performance, usage, and/or status of the connected devices over time (e.g., during transfers in ownership of the connected devices, use of the connected devices as collateral, etc.).

Figure 6:
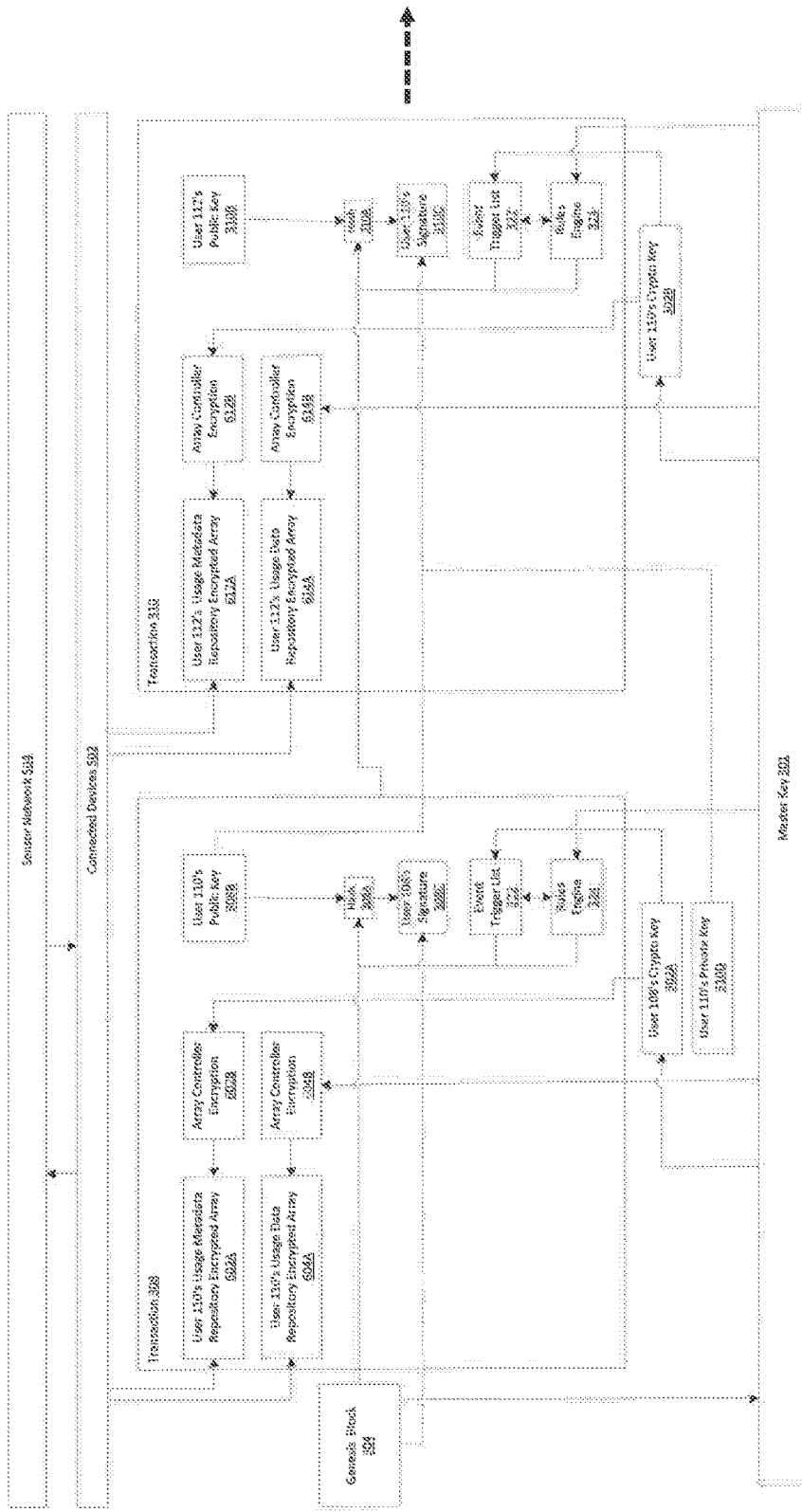

FIG. 6 is a schematic diagram of illustrating an exemplary structure 600 of a hybrid, public-private blockchain ledger, which may be generated through the interaction of components of computing environment 100, in accordance with the disclosed embodiments. For example, as described in reference to FIG. 6, users 108, 110, and 112 may be associated with corresponding devices (e.g., client devices 102, 104, and 106), which may be configured to execute one or more stored software applications (e.g., a wallet application) capable of obtaining a current version of a hybrid blockchain ledger from one or more networked computer systems (e.g., one of peer systems 160 configured to "mine" broadcast transactions and update ledgers).

In some aspects, and as described above, the embodiments described in FIG. 5 may incorporate the exemplary hybrid blockchain ledger described above in reference to FIGS. 3 and 5 (e.g., hybrid blockchain ledger structures 300 and 400), and may augment hybrid blockchain ledger structure 300 of FIG. 3 to include and track monitored data indicative of a location, performance, usage, and/or status of one or more connected devices 502 disposed within environment 100 and in communication with client devices 102, 104, and 106, as received from sensor network 404.

For example, and as described above, a prior user (e.g., user 108) may elect to further transfer a portion of tracked assets to an additional user (e.g., user 110). For example, as described above, the one or more software applications executed by client device 102 may cause client device 102 to perform operations that generate input and output data specifying a new transaction (e.g., transaction 308 of FIG. 6) that transfers ownership of the tracked asset portion from user 108 to user 110, and further, that transmit the generated data to one or more of peer systems 160 for verification, processing (e.g., additional cryptographic hashing) and inclusion into a new block of the hybrid blockchain ledger.

For example, data specifying transaction 308 may include, but is not limited to, a cryptographic hash 308A of a prior transaction (e.g., which transferred ownership to user 108), a quantity or number of units of the tracked asset portion that are subject to transfer in transaction 308, and a public key of the recipient (e.g., public key 308B of user 110). Further, in some aspects, the data specifying transaction 308 may include a digital signature 308C of the user 108, which may be applied to hash 308A and public key 308B using a private key 308D of user 108 using any of the exemplary techniques described above. As described above, the presence of user 108's public key within transaction data included within the conventional blockchain ledger may enable various devices and systems (e.g., client devices 102, 104, and/or 106, peer systems 160, etc.) to verify the user 108's digital signature 308D, as applied to data specifying transaction 308. Further, and as described above, client device 104 may also parse data specifying the prior transaction and extract encrypted and/or hashed copies of rules engine 322 and trigger event list 324.

Additionally, in some aspects, the data specifying transaction 308 may also include user 108's usage data (e.g., as received from connected devices 402 using any of the exemplary techniques described above), which may be encrypted using master key 301 (e.g., by array controller encryption 604B) to generate an encrypted array 604A of user 108's usage data. In further aspects, the data specifying transaction 308 may also include metadata indicative of a duration of usage, time, date, location, and/or other network connected devices in proximity, which may be encrypted using user 108 private crypto key 302A (e.g., by array controller encryption 602A) to generate an encrypted array of metadata 602A.

In certain aspects, client device 102 may append the encrypted and/or hashed copies of rules engine 322 and trigger event list 324 to the data specifying transaction 308 (e.g., cryptographic hash 308A, public key 308B, and digital signature 308C) and the usage data (e.g., encrypted arrays 602A and 604A and array controller encryption 602B and 604B), and transmit the data specifying transaction 308 to one or more of peer systems 160 for verification, processing (e.g., additional cryptographic hashing) and inclusion into a new block of the hybrid blockchain ledger.

In further embodiments, and as described above, user 110 may elect to further transfer that tracked asset portion to yet another user (e.g., user 112). For example, as described above, the one or more software applications executed by client device 104 may cause client device 104 to perform operations that generate input and output data specifying a new transaction (e.g., transaction 310 of FIG. 6) that transfers ownership of the tracked asset portion from user 110 to user 112, and further, that transmit the generated data to one or more of peer systems 160 for verification, processing (e.g., additional cryptographic hashing) and inclusion into a new block of the hybrid blockchain ledger.

For example, data specifying transaction 310 may include, but is not limited to, a cryptographic hash 310A of prior transaction 308, a quantity or number of units of the tracked asset portion that are subject to transfer in transaction 310, and a public key 310B of user 112. Further, in some aspects, the data specifying transaction 310 may include a digital signature 310C of the user 110, which may be applied to hash 310A and public key 310B using a private key 310D of user 110, as described above. Additionally, and by way of example, the presence of user 110's public key 308B within transaction data included within the hybrid blockchain ledger may enable various devices and systems (e.g., client devices 102, 104, and/or 106, peer systems 160, etc.) to verify the user 110's digital signature 310C, as applied to data specifying transaction 310.

Further, and as described above, data specifying transaction 310 may also include user 110's usage data (e.g., as received from connected devices 402 using any of the exemplary techniques described above), which may be encrypted using master key 301 (e.g., by array controller encryption 614B) to generate an encrypted array 614A of user 108's usage data. In further aspects, the data specifying transaction 308 may also include metadata indicative of a duration of usage, time, date, location, and/or other network connected devices in proximity, which may be encrypted using user 110's private crypto key 302A (e.g., by array controller encryption 612B) to generate an encrypted array of metadata 612A.

In certain aspects, client device 104 may append the encrypted and/or hashed copies of rules engine 322 and trigger event list 324 to the data specifying transaction 310 (e.g., cryptographic hash 310A, public key 310B, and digital signature 310C) and the usage data (e.g., encrypted arrays 612A and 614A and array controller encryption 612B and 614B), and transmit the data specifying transaction 310 to one or more of peer systems 160 for verification, processing (e.g., additional cryptographic hashing) and inclusion into a new block of the hybrid blockchain ledger.

In certain embodiments, as described above, the inclusion of usage data within hybrid blockchain ledgers maintains an continuous log of usage and/or consumption of connected-device resources by users 108, 110, and 112, and any additional or alternate users that generate and submit (through corresponding client devices) transaction data to one or more of peer systems 160. In further aspects, the sensor data (e.g., as received from connected devices 402) may be batched in a periodic set and treated as a transaction, and additionally or alternatively, may be appended into an associated repository of the transaction blockchain (e.g., using system 140, peer systems 160, etc.).

Further, in some aspects, the exemplary blockchain ledgers described above may facilitate processes that track an ownership of one or more of the connected devices and further, enable current owners (e.g., user 110) to transfer ownership to others (e.g., user 112). For example, when the disclosed embodiments create a new block to account for usage data, a private key of the current owner may be user to authenticate the usage and allow for the generation of the new block. In other aspects, a private key linked to a device of the current owner (e.g., stored locally on a memory of the current owner's device) may authenticate the usage and allow for the generation of the new block without input or intervention from the current owner. In some instances, the private key of the current owner's device may differ from the current owner's private key, Further, and in some embodiments, the automated and programmatic authentication of the usage by the current owner's device may reduce instances of under-reported usage data associated with owner-initiated authentication protocols.

III. Exemplary Processes for Tracking Usage Characteristics of Internet-Connected Devices Using Hybrid, Blockchain Data Structures In various embodiments, such as those described above, computer systems maintained by a rules authority (e.g., a financial institution, etc.) may augment conventional, decentralized blockchain ledger architectures by selectively encrypting ledger data to protect both a privacy of owners of tracked assets and a confidentiality of existing instruction sets maintained within the blockchain ledger. Further, by incorporating an encrypted rules engine and corresponding list of triggering events (e.g., an event trigger list) into each block of the conventional blockchain ledger architecture (and thus generating a hybrid, public-private blockchain ledger architecture), computer-implemented systems and methods consistent with the disclosed embodiments may perform operations that provide owners or holders tracked assets with recovery options in an event of fraud or malicious activity, while maintaining the public availability and verification characteristic of conventional blockchain ledgers.

a. Exemplary Asset-Specific Hybrid, Blockchain Ledger Data Structures Tracking Asset Ownership and Usage Characteristics In other aspects, one or more of the exemplary hybrid blockchain ledger architectures described above may provide a centralized and transparent mechanism that establishes an entity's ownership interest in a particular asset or group of assets and further, to record, characterize, and track an evolution of a usage, location, condition, and care of the particular asset or group of assets throughout the entity's ownership. The disclosed embodiments may, for example, establish a hybrid, blockchain ledger data structure to track the usage, location, condition, and care throughout a life-cycle of the particular asset or group of assets. As described below, when the entity acquires an ownership interest in the particular asset or group of assets, the disclosed embodiments may be configured to generate a new ledger block within the established hybrid, blockchain ledger data structure that confirms the entity's ownership stake. Further, the newly generated ledger block may include a usage log for the entity that, as described below, provides a record of the usage, condition, and care of the particular asset or groups of assets during the entity's ownership of the particular asset or group of assets.

In certain instances, computer systems maintained by business entities, such as financial institutions, insurance companies, and governmental entities (e.g., taxing authorities), may obtain portions of the hybrid, blockchain ledger data structure for the particular asset or groups of assets, may access the usage log, and may extract usage data indicative of the entity's use and care of the particular asset or group of assets over time. One or more of the business-entity systems may process the extracted usage data to quantify a condition and life expectancy of the asset, and derive data indicative of the entity's care of the particular asset or groups of assets over time. These business-entity systems may, in certain instances, rely on the quantified condition, life expectancy, and care data to value the particular asset or groups of assets, establish a credit-worthiness of the entity, and further, quantify an institution's exposure to risk when insuring the entity and/or the particular asset or groups of assets. In certain aspects, the disclosed embodiments may enable financial institutions and insurance companies to customize financing terms and/or insurance rates to reward the entity for the time-evolving care of the particular asset or groups of assets, thus customizing financial and insurance products to the particular asset or groups of assets and further, to the current and expected future actions of the entity.

By way of example, an entity (e.g., user 110) may acquire a sole ownership interests in a connected device, such as a connected vehicle capable of communicating across network 120 with one or more additional devices and computing devices operating within environment 100. In certain aspects, user 110 may desire to obtain insurance coverage for the newly acquired vehicle, and a device held by user 110 (e.g., client device 104) may access a web page associated with an insurance company (e.g., as provided by server 142 of system 140, which may be associated with the insurance company) and additionally or alternatively, may execute a mobile application provided by and associated with the insurance company. For instance, user 110 may provide, as input to a web page or other graphical user interface presented by client device 104, data indicative of user 110's ownership interest in the vehicle as a portion of an application to obtain insurance coverage.

In some aspects, the provided data may identify, among other things, user 110 (e.g., a full name, an address, a governmental identifier (e.g., a driver's license number, social security number, etc.); the connected vehicle (e.g., a vehicle identification number (VIN), a make, a model, a year, etc.); a government-issued identifier of the vehicle (e.g., a tag number, a title number, a registration number); and a condition of the vehicle (e.g., a current mileage). The disclosed embodiments are not limited to the exemplary data elements identified above, and in further embodiments, user 110 may provide, as input to client device 104, any additional or alternate data that establishes user 110's ownership interest in the vehicle and would be appropriate for inclusion in the exemplary hybrid, blockchain ledgers described above.

Client device 104 may process and package the input data, and transmit portions of packaged data to a computer system associated with the insurance company (e.g., system 140) for processing and subsequent generation of a quote for coverage. In certain aspects, system 140 may store portions of the packaged data within a locally accessible data repository (e.g., data repository 144) and further, may transmit portions packaged data to one or more of peer systems 160, for subsequent processing and incorporation into one or more blocks of a hybrid, blockchain ledger data structure that records user 110's ownership of the connected vehicle and tracks an evolving condition of the connected vehicle during user 110's ownership. In other aspects, client device 110 may transmit portions of the packaged input data directed to one or more of peer system 160, e.g., as an alternate to or in addition to the transmission of the packaged input data to system 140.

In certain aspects, as described above, one or more of peer systems 160 may act as "miners" for the vehicle-specific, hybrid, blockchain ledger, and may competitively process the packaged data (either alone or in conjunction with other data) to generate a new ledger block, which may be appended to the vehicle-specific, hybrid blockchain ledger to record and establish user 110's ownership interest in the connected vehicle. The vehicle-specific, hybrid blockchain ledger, updated to include the new ledger block, may be distributed across peer systems 160 (e.g., through a peer-to-peer network) and to other devices and systems operating within environment 100, including those held by the insurance company (e.g., system 140), a financial institution (e.g., system 141), and a governmental entity (e.g., system 145), which may rely on the vehicle-specific, hybrid, blockchain ledger data structure to inform decisions on valuation, risk, and financing.

In certain aspects, and as described above, the new ledger block (e.g., as generated by peer systems 160 through competitive mining) may include information that identifies user 110 (e.g., full name, address, etc.) and the connected vehicle (e.g., a vehicle identification number (VIN), a make, a model, a year, etc.). In additional aspects, and through the competitive mining process, one or more of peer systems 160 may access a prior ledger block of the vehicle-specific, hybrid, blockchain ledger data structure (e.g., one confirming the titling of the connected vehicle in user 110's name and user 110's payment of appropriate taxes and registration fees to a governmental ministry of transportation or department of motor vehicles). In certain aspects, one or more of peer systems 160 may compare the connected-vehicle data provided by client device 104 against data extracted from the prior ledger block to confirm the accuracy and completeness of the connected-vehicle data prior to incorporation into the new ledger block.

Further, the updated vehicle-specific, hybrid, blockchain ledger data structure (to which the new ledger block is appended) may also include usage data repositories that, for example, track an evolution of a usage and a condition of the connected vehicle throughout user 110's ownership. In some aspects, the usage data repositories may be incorporated within blocks of the hybrid, blockchain ledger data structure in unencrypted format (e.g., usage data repository 518 of FIG. 5B) or alternatively, may be encrypted via user 110's private crypto key (e.g., one of usage data repositories 604A and 604B of FIG. 6). The disclosed embodiments are, however, not limited to usage data repositories included within corresponding blocks of the exemplary hybrid, blockchain ledger data structures described above, and in further aspects, a usage data repository for the connected device (e.g., usage data repository 508 of FIG. 5A) may be stored locally on device 104, within a data repository of systems 140, 141, and/or 145, and further, in any addition or alternate location (e.g., cloud storage) accessible across network 120.

In certain aspects, the disclosed embodiments may incorporate, into the usage data repositories, ledger blocks indicative of a location, one or more performance characteristics, one or more usage characteristics, and/or an operational state of the connected device captured by integrated and/or external sensor devices at discrete points in time or during predetermined temporal intervals. In some instances, various business entities, such as insurance companies, financial institutions, and governmental entities, may rely on the usage log and the time-evolution of the connected-vehicle's condition to inform decisions on valuation, risk, and financing.

As described above, the connected vehicle may include one or more integrated sensor devices and additionally or alternatively, may operate within a network of external sensor devices administered by a sensor-network computer system (not depicted in FIG. 1). The integrated and/or external sensor devices may be capable of detecting, among other things, a location of the connected vehicle, performance characteristics (e.g., characteristics of the vehicle's performance, such as engine temperature, fuel-air mixture, emission characteristics, etc.), usage characteristics (e.g., a current mileage, a current speed, etc.), and additionally or alternatively, an operational status (e.g., data indicative of whether scheduled maintenance is required). In further aspects, one or more of the integrated sensors may be configured to detect a condition or operation of the connected vehicle (e.g., an accelerometer that detects a rapid deceleration or acceleration indicative of a collision, a discharge of an airbag, and an application of an anti-lock braking system, etc.). Further, the one or more external sensor devices may be capable of determine a presence of the connected vehicle at one or more particular locations, such as toll plazas, dealer service centers, parking garages, etc., based on a detection of a RF transponder or other communications device associated with the connected vehicle.

The disclosed embodiments are, however, not limited to any particular type of quantity of integrated and external sensor devices. In further embodiments, a location, performance, usage, and/or status of the connected vehicle (and any other asset by user 108 and tracked within hybrid, blockchain) may be detected by any additional or alternate type or quantity of integrated or external sensors appropriate to the connected device (or tracked asset) and compatible with the devices and systems operating system environment 100.

In some aspects, a processor (or processing unit) integrated into the connected vehicle may execute one or more software applications to obtain the captured sensor data (e.g., the location, performance, usage, status, and/or condition data described above). Similarly, an external computer system associated with the external sensor network may be communicatively coupled to the one or more external sensor devices operating within the external sensor network (e.g., to sensor network 504 across network 120 or using peer-to-peer communication protocols, such as near-field communication (NFC) protocols), and may execute one or more software applications to obtain the captured sensor data from at least a subset of the external sensor devices that monitor the connected vehicle within environment 100.

In some embodiments, the integrated processor and/or the external computing system may execute software applications to classify the captured sensor data in accordance with various parameters, which include, but are not limited to, a data type, a timeliness of the captured sensor data (i.e., relating to a current state of the connected device), as association of the captured sensor data to user 110's intentions or culpability (e.g., the captured sensor data resulted from an intended activity of user 110 and additionally or alternatively, an unintended or unforeseen action). In certain aspects, the integrated processor and/or the external computing system may package the classified sensor data into corresponding data structures for storage in one or more accessible memories.

Additionally, and in some embodiments, the integrated processor and/or the external computing system may augment the captured and classified sensor data with metadata that characterize the internal or external sensors, the sampling of these sensors, and the disposition of other monitored devices within environment 100. In some instances, the integrated processor and/or the external computing system may store the metadata in conjunction with corresponding portions of the classified sensor data within the one or more accessible memories or storage devices.

For example, the classified sensor data portions may be augmented within elements of metadata that include, but are not limited to, timestamps associated with particular elements of sensor data, identifiers of sensor devices that captured the particular elements of sensor data (e.g., MAC addresses, IP addresses, network locations within the external sensor network, etc.), a time period during which one or more of the integrated or external sensor devices monitored the connected device, locations of corresponding ones of the integrated or external sensor devices, an IP address of the external sensor network and/or the external computer system, and identifiers of additional connected devices (e.g., connected devices 502) monitored by the integrated or external sensor devices and proximate to the connected vehicle at the corresponding timestamps. The disclosed embodiments are, however, not limited to these exemplary sensor data classifications and metadata types, and in other embodiments, the integrated processor and/or the external computing system may classify the captured sensor data in accordance with any additional or alternate relevant classification, and may augment the classified sensor data with any additional or alternate metadata appropriate to the connected device, the integrated and/or external sensor devices, and the captured sensor data.

The integrated processor and/or the external computing system may, in some aspects, transmit portions of the classified sensor data and additionally or alternatively, corresponding portions of the metadata, to one or more of peer systems 160. As described above, peer systems 160 may competitively process the classified sensor data, either alone or in conjunction with the corresponding metadata, to generate a new ledger block, which may be appended to the hybrid, blockchain ledger data structures for the connected vehicle, and which may be distributed across peer systems 160 (e.g., through a peer-to-peer network) and to other devices and systems operating within environment 100.

In certain aspects, one or more of peer systems 160 may incorporate the classified sensor data (either alone or augmented with the corresponding metadata) as a "transaction" into the new ledger block upon receipt from the integrated processor and/or the external computing system. In other aspects, one or more of peer systems 160 may batch the classified sensor data (either alone or augmented with the corresponding metadata), and incorporate the batched sensor data and corresponding batched metadata as a "transaction" into the new ledger block in accordance with a predetermined schedule (e.g., hourly, daily, weekly, etc.).

In some aspects, the new ledger block may encrypt the incorporated sensor data and/or the corresponding metadata using a private crypto key of user 110 (e.g., encrypted metadata repository 612A and/or encrypted data repository 614A). The encryption of the sensor data and/or the corresponding metadata may, in some aspects, authenticate the usage data for various business entities, such as insurance companies, financial institutions, and governmental entities, that rely on the usage data to inform decisions on valuation, risk, and financing. In other instances, the sensor data and/or the corresponding metadata may incorporated into the new ledger block in unencrypted form (e.g., usage data repository 518) to facilitate public access and review of the connected device's usage data. Further, in additional embodiments, integrated processor and/or the external computing system may transmit portions of the classified sensor data and additionally or alternatively, corresponding portions of the metadata to one or more additional devices and systems within environment 100 (e.g., device 104 and/or system 140) which may incorporate the portions of classified sensor data and/or metadata within locally accessible usage data repositories (e.g., usage data repository 508).

Further, and as described above, one or more of peer systems 160 may access a prior block of the asset-specific hybrid, blockchain ledger data structure that tracks the ownership of the connected vehicle, and may access and encrypted list of event triggers (e.g., event triggers list 322) and an encrypted rules engine (e.g., rules engine 324), which peer systems 160 may hash into the new ledger block using any of the exemplary techniques described above. For example, the list of triggering events may include events that would trigger a generation of a new ledger block, such as a receipt of captured sensor data (and corresponding metadata) and activity reflective of a change in an ownership interest in the connected vehicle, including, but not limited to, a sale, a transfer of an ownership interest, an attachment of a lien to a particular ownership stake, and a release of the an attached lien. The list of triggering events may further identify one or more events that would cause an insurance company, a financial institution, and/or a governmental entity to establish or reassess decisions on valuation, risk, and financing based on usage data (e.g., a request for a new product or service, a reassessment schedule, a detection of a new ledger block including sensor data and/or metadata, etc.).

Rules engines consistent with the disclosed embodiments may, in some aspects, initiate a generation of a new data block in response to a detected change in ownership and/or in response to the received sensor data and/or metadata. Additionally or alternatively, the rules engine may include rules that facilitate implementation and/or provision of the agreed-upon ownership rights and obligations allocated to user 110, including, but not limited to, an agreed-upon disbursement of proceeds from a sale of the connected vehicle, and further, an initiation processes to electronically transfer portions of the proceeds to recipients. In other aspects, the rules engine may specify one or more processes and steps taken by an insurance company, a financial institution, and/or a governmental entity to establish or reassess decisions on valuation, life expectancy, risk, and financing based on usage data, and further, additional actions (e.g., denial of insurance coverage, termination of existing insurance coverage, specific terms and conditions of financing, etc.) taken in response to the established or reassessed decisions.

In further instances, as described above, systems 140, 141, and/or 145 may operate as a rules authority, and may execute software instructions to decrypt a rules engine and/or an event trigger list included within an updated version of the hybrid private-public ledger data structure that tracks the ownership of the connected vehicle (i.e., the latest, longest hybrid private-public ledger) using any of the exemplary techniques described above. For example, systems 140, 141, and/or 145 may modify or augment a portion of the decrypted rules engine and/or event triggers list to incorporate data indicative of one or more of user 110's ownership rights and obligations (e.g., disbursement processes, etc.). In further aspects, systems 140, 141, and/or 145 may modify or augment a portion of the decrypted rules engine and/or event triggers list to establish events triggering an establishment or reassessment on valuation, risk, and financing associated with user 110 and/or the connected vehicle, to identify specific processes for establishing or reassessing valuation, risk, and financing decisions based on usage data, and further additional actions taken in response to the established or reassessed decisions.

Systems 140, 141, and/or 145 may, in some aspects, encrypt the modified rules engine and/or event triggers list using any of the exemplary techniques described above, and provide the encrypted, but modified, rules engine and/or event triggers list to peer systems 160 for incorporation into the new ledger block of the hybrid private-public ledger data structure. The disclosed embodiments are, however, not limited to these exemplary triggering events and rules, and in additional embodiments, and as described below, the list of triggering events and rules may include any additional or alternate events and rules appropriate to user 110, the connected vehicle, and to the insurance company, financial institution, and/or governmental entity.

In some aspects, peer systems 160 may access the updated version of the vehicle-specific, hybrid private-public ledger data structure that tracks the ownership of the connected vehicle (i.e., the latest, longest hybrid private-public ledger), and process a final block of that data structure to access the event trigger list and rules engine, which may be hashed into the new ledger block using any of the exemplary techniques described above. In some aspects, when user 110 purchases a "new" connected vehicle, the updated version of that vehicle-specific hybrid private-public ledger data structure may include only a genesis block, which may be generated by a manufacturer of the connected vehicle using any of the techniques outlined above. By establishing and maintaining the hybrid private-public ledger data structure based on a genesis block generated by the manufacturer of the connected vehicle, the disclosed embodiments may enable one or more devices and systems operable within environment 100 to track an evolution of an ownership and/or usage of the connected vehicle throughout its lifecycle.

By way of example, the new ledger block may encoded using a Base58 encoding scheme (e.g., as employed for blockchain ledgers memorializing transactions involving Bitcoin™ virtual currencies). The disclosed embodiments are, however, not limited to these exemplary encoding schemes, and in further embodiments, peer systems 160 may encode the new ledger block using a human readable cryptograffiti encoding scheme, which may simplify the blockchain data structure. Further, and by way of example, the new ledger block generated by peer systems 160 may be structure to include, among other things: a block header (which identifies an address of a prior block); an identifier of the corresponding one or peer systems 160 that created the additional ledger block; a rules header that identifies the integrated and/or external sensor devices and includes a rules associate key (e.g., that associates a rule to the Internet-connected device); an encrypted list of event triggers and an encrypted rules engine; a header for the received transaction data; and the received transaction data written into the hybrid, blockchain data structure.

Further, and as described above, peer systems 160 may include data identifying the integrated and/or external sensor devices within a rules header of the additional ledger block, which may provide the rules engine with a mapping of all connected sensor devices, both integrated into the Internet-connected device and operating within the external sensor network. Additionally, peer systems 160 may write the transaction data into the additional ledger block as HEX, Unicode, a combinations of the two, and/or any additional or alternate encoding suitable for the transaction data and the new ledger block.

As described above, peer systems 160 may append the new ledger block to the existing hybrid, blockchain ledger data structure for the connected device (e.g., to generate an updated hybrid, blockchain ledger data structure), which may be distributed across peer systems 160 (e.g., through a peer-to-peer network) and to other devices operating environment 100 (e.g., across network 120).

b. Exemplary Systems and Methods for Determining Asset Characteristics Based on Usage Data Tracked within Asset-Specific, Hybrid, Blockchain Ledger Data Structures In some aspects, computer systems maintained by insurance companies (e.g., system 140), financial institutions (e.g., system 141), and/or governmental entities (e.g., system 145) may execute software applications that extract, from portions of one or more generated hybrid, blockchain ledger data structures, data indicative of user 110's use of the connected vehicle and/or other tracked assets owned or controlled by user 110. These computer systems may, in further aspects, input portions of the extracted use data into one or more business-specific algorithms to determine a score that quantifies an ability and proclivity of user 110 to care for and maintain the connected vehicle, one or more of the other tracked assets, and additionally or alternatively, an aggregation of all assets controlled or owned by user 110. Based on the extracted use data and the determined score, these computer systems may compute a valuation, life expectancy, and/or depreciation of the connected device and/or the other tracked assets, which may inform decisions on risk exposure and financing.

By way of example, the insurance company (e.g., business entity 150) may provide user 110 with insurance coverage for the connected device. System 140 may, in some instances, determine that user 110's current insurance policy expires on Dec. 31, 2015, and must be renewed in order to extend coverage beyond Jan. 1, 2016. In one aspects, system 140, acting as a rules authority, may access a stored list of event triggers (e.g., within data repository 144), and may determine that the potential renewal of user 110's insurance policy triggers a reassessment of the terms and conditions of that insurance policy in view of usage data for the connected device collected by one or more integrated or external sensor devices since a prior renewal of the policy (e.g., on Jul. 1, 2015).

In an embodiment, and as described above, system 140 may execute software applications that access portions of the hybrid, blockchain ledger data structure that tracks ownership and usage of the connected devices. In some aspects, system 140 may access one or more stored portions of the hybrid, blockchain ledger data structure (e.g., stored within data repository 144). Additionally or alternatively, system 140 may obtain portions of the hybrid, blockchain ledger data structure from one or more of peer systems 160, as described above.

System 140 may, in certain aspects, parse the accessed or obtained portions of the hybrid, blockchain ledger data structure to identify and extract sensor data captured by corresponding integrated and/or external sensor devices subsequent to the last prior renewal date of user 110's insurance policy (e.g., Jul. 1, 2015). Additionally, in some aspects, system 140 may also identify and extract metadata that augments at least a portion of the extracted sensor data. As described above, the extracted sensor data may characterize, over time, a location of the connected vehicle, a performance of the connected vehicle (e.g., characteristics of the vehicle's performance, such as engine temperature, fuel-air mixture, emission characteristics, etc.), user 110's usage of the connected vehicle (e.g., a current mileage, a current speed, etc.), and a condition of, maintenance of, and incidents involving the connected vehicle.

Further, and by way of example, the extracted metadata that include, but are not limited to, timestamps associated with particular elements of extracted sensor data, identifiers of sensor devices that captured the particular elements of extracted sensor data (e.g., MAC addresses, IP addresses, network locations within the external sensor network, etc.), a time period during which one or more of the integrated or external sensor devices monitored the connected device, locations of corresponding ones of the integrated or external sensor devices, an IP address of the external sensor network and/or the external computer system, and identifiers of additional connected devices (e.g., connected devices 502) monitored by the integrated or external sensor devices and proximate to the connected vehicle at the corresponding timestamps. The disclosed embodiments are, however, not limited to these exemplary sensor data classifications and metadata types, and in other embodiments, the integrated processor and/or the external computing system may classify the captured sensor data in accordance with any additional or alternate relevant classification, and may augment the classified sensor data with any additional or alternate metadata appropriate to the connected device, the integrated and/or external sensor devices, and the captured sensor data.

In an embodiment, system 140 may access and encrypted rules engine (e.g., as stored locally within data repository 144), and may decrypt the access rules engine using a master key of the rules authority (e.g., master key 301). System 140 may, in certain aspects, parse the decrypted rules engine to identify one or more proprietary operations and/or algorithms that enable system 140 to quantifies an ability and proclivity of user 110 to care for and maintain a condition of the connected vehicle, to characterize a risk incurred by the insurance company through its indemnification of user 110's operation of the connected vehicle, and further, to obtain an updated valuation and/or life expectancy of the connected vehicle based on its operation by user 110 since the prior renewal (i.e., Jul. 1, 2015).

System 140 may, in some aspects, process the extracted sensor data and corresponding metadata to serve as inputs to the identified proprietary operations and algorithms, which may generate a "care rating" that characterizes of user 110's care and maintenance of the connected vehicle since the prior renewal. The care rating may, for example, represent a numerical score having a minimum value (e.g., zero) indicative of a disregard by user 110 for the care and maintenance of the vehicle (e.g., based on multiple instances of outstanding maintenance issues, recalls, equipment failures, and collisions) and a maximum value (e.g., unity or one hundred) indicative of user 110's sedulous care of the connected vehicle (e.g., based on no outstanding maintenance, equipment issues, recalls, and collisions).

Similarly, and based on the input of the extracted sensor data and corresponding metadata into one or more of the identified proprietary operations and algorithms described above, system 140 may generate a "risk-exposure rating" that characterizes the risk to which the insurance company is exposed through its indemnification of user 110 and the connected vehicle. The risk-exposure rating may, in some instances, represent a numerical score having a minimum value (e.g., zero) indicative of minimum risk and a maximum value (e.g., unity or one hundred) indicative of an extreme level of risk and financial liability resulting from the insurance company's continued indemnification of user 110's operation of the connected vehicle.

In one aspect, the care rating computed by system 140 may be connected-vehicle-specific and may characterizes of user 110's care and maintenance of only the connected vehicle. User 110 may, however, own, operate, and/or control access to one or more additional assets tracked within corresponding hybrid, blockchain ledger data structures (e.g., user 110's additional assets). In an embodiment, system 140 may execute software applications that parse the asset-specific hybrid, blockchain ledger data structures that track ownership and usage of at least a subset of user 110's additional assets, and system 140 may extract additional captured sensor data and corresponding metadata for the subset of these additional assets. System 140 may, based on the additional captured sensor data and corresponding metadata, compute care ratings for one or more of user 110's additional assets using any of the proprietary operations and algorithms described above (e.g., as set forth in the decrypted rules engine). In one aspect, system 140 may process the computed care ratings to generate an aggregated care rating for user 110 (e.g., based on a usage-weighted average of the asset-specific care ratings), which characterizes and quantifies user 110's care and maintenance of the subset of the additional assets. The aggregated care rating for user 110 may, by way of example, mediate an imbalanced usage of the various assets owned, controlled, or operated by user 110 since the prior renewal.

In further instances, system 140 may input the extracted sensor data and corresponding metadata to one or more of the proprietary operations and algorithms (e.g., as set forth in the decrypted rules engine) to compute an updated valuation and/or life expectancy of the connected vehicle. In some aspects, the updated valuation and/or life expectancy may be based on a comparison or average of computed valuations (e.g., determined by system 140 or other systems using the proprietary operations and algorithms) of other vehicles similar in make, model, age, and usage to the connected vehicle.

For example, system 140 may access a portion of the hybrid, blockchain ledger data structure associated with the connected vehicle to identify a make, model, and/or age of the connected vehicle. System 140 may also access one or more additional hybrid, blockchain ledger data structures (e.g., as stored within data repository 144 or as obtained from peer systems 160) that track additional connected vehicles having similar or identical makes, models, and ages, and may obtain valuations (e.g., from corresponding portions of the additional hybrid, blockchain ledger data structures) for a subset of the additional vehicles having mileages similar to that of the connected vehicle and/or that were operated within geographic regions that include the operational locations of the connected vehicle.

In certain aspects, using the proprietary operations and algorithms, system 140 may compute the valuation and/or life expectancy of the connected vehicle based on an average of the valuations and/or life expectancies of the subset of the additional vehicle. Additionally or alternatively, system 140 may adjust the computed valuation and/or life expectancy of the connected to reflect a condition of the connected vehicle (e.g., as characterized by the computed care rating) in accordance with one or more of the proprietary operations and algorithms.

The disclosed embodiments are, however, not limited to any particular algorithm for computing the care rating (e.g., for the connected vehicle or aggregated for user 110), the risk-exposure rating, and/or the valuation of the connected vehicle. In further aspects, system 140 may compute or determine a care rating, a risk-exposure rating, and/or a valuation using any additional or alternate algorithm appropriate to the Insurance company, the connected vehicle, and the extracted sensor data and corresponding metadata.

The disclosed embodiments may also incorporate the updated care ratings, the risk-exposure rating, and the valuation of the connected vehicle into a corresponding portion of the hybrid, blockchain ledger data structure that tracks ownership and usage of the connected vehicle. For example, system 140 may execute software instructions that provide one or more of the computed care rating, the risk-exposure rating, the valuation, and/or life expectancy of the connected vehicle to one or more of the peer systems, along with a period of validity associated with the calculations (e.g., through the Dec. 31, 2015, expiration of the current insurance policy) and information identifying user 110 and the connected vehicle. As described above, one or more of peer systems 160 may act as "miners" for the vehicle-specific, hybrid, blockchain ledger, and may competitively process the transmitted data (either alone or in conjunction with other data) to generate a new ledger block, which may be appended to the vehicle-specific, hybrid blockchain ledger to record the updated care rating, the risk-exposure rating, and the valuation and/or life expectancy of the connected vehicle.

In further embodiments, and as described below in reference to FIG. 7, system 140 may execute software instructions that generate, based on one or more internal underwriting standards, new terms and conditions for the renewal of user 110's insurance policy that reflect the updated care ratings, the risk-exposure rating, and the valuation of the connected vehicle. For example, system 140 may parse the hybrid, blockchain ledger data structure that tracks ownership and usage of the connected vehicle to identify values of the care rating, the risk-exposure rating, and the valuation of the connected vehicle included within one or more prior data blocks, which system 140 relied upon to generate terms and conditions during a prior renewal cycle.

In some aspects, system 140 may generate terms data, which may identify the new monthly premium, an effective date (e.g., Jan. 1, 2016), and a term (e.g., six months), and transmit the terms data to a device of user 110 (e.g., device 104) across network 120 using any of the communication protocols described above. In certain aspects, client device 104 may receive and render the terms data for presentation to user 110 within a corresponding web page or GUI, and user 110 may provide input to client device 104 that evinces an acceptance or rejection of the terms data. Client device 104 may execute software instructions that transmit the input to system 140 for further processing (e.g., renewal of the policy and/or cancellation of the renewal).

Figure 7:
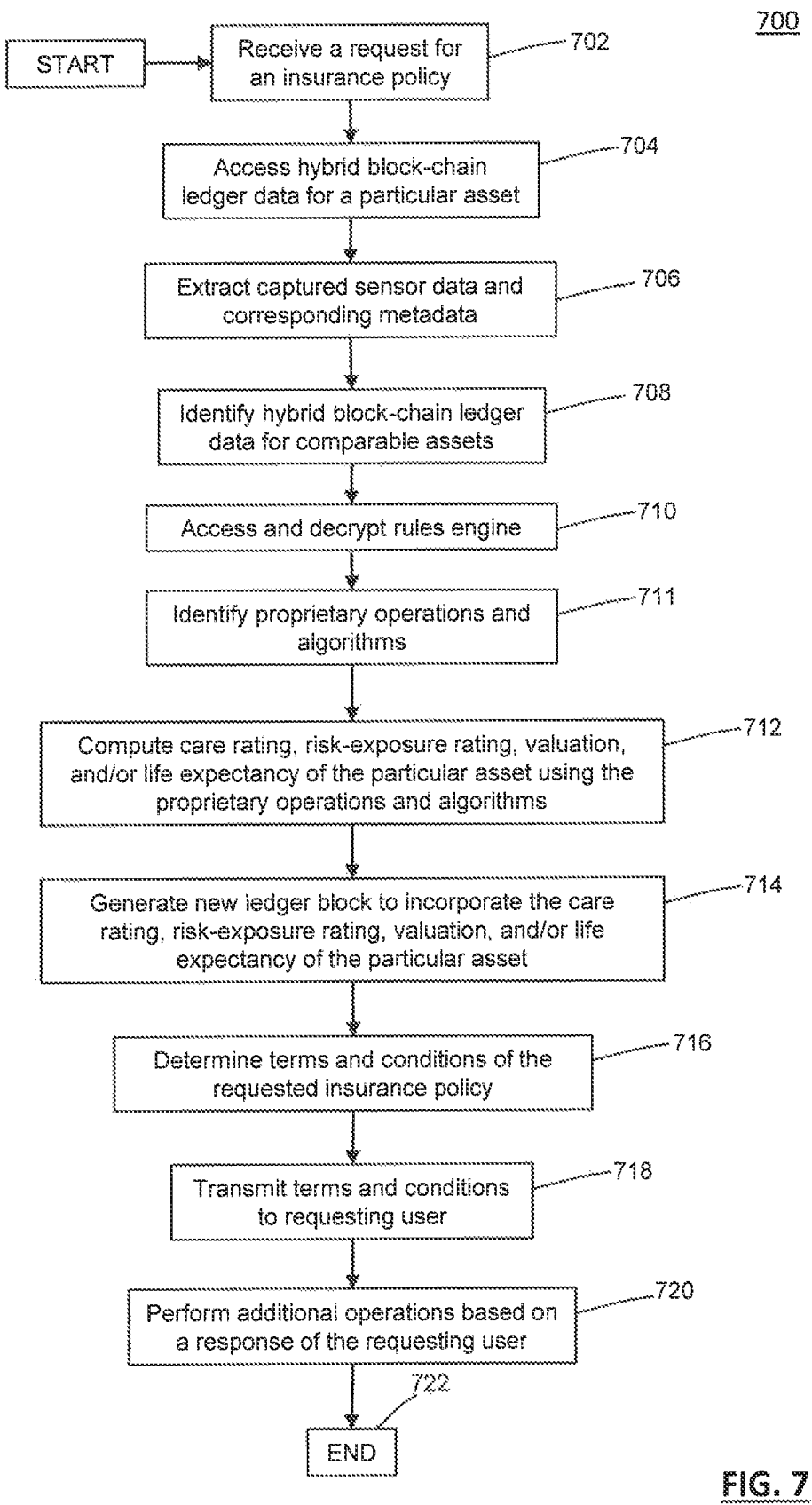
FIG. 7 is a flowchart of an exemplary process for performing operations in response to events tracked within a hybrid blockchain ledger, consistent with the disclosed embodiments.

FIG. 7 is a flowchart of an exemplary process 700 for automatically performing operations consistent with usage data of an asset tracked within a hybrid blockchain ledger, in accordance with disclosed embodiments. In some aspects, a computer system maintained by an insurance company (e.g., system 140 of business entity 150) may store, within a locally accessible data repository (e.g. data repository 144), data indicative of hybrid, blockchain ledgers that track ownership and usage of one or more assets held by one or more corresponding owners. For example, and as described above, user 110 may acquire an interest in an asset (e.g., a connected vehicle), the ownership and usage of which may be tracked by a corresponding hybrid, blockchain ledger data structure using any of the exemplary techniques described above.

For example, and as a requirement to operating the connected vehicle, user 110 may be required by a governmental entity to obtain at least a minimum level of insurance coverage. In certain aspects, user 110 may desire to obtain insurance coverage for the newly acquired vehicle from the insurance company, and a device held by user 110 (e.g., client device 104) may access a web page associated with the insurance company (e.g., as provided by server 142 of system 140, which may be associated with the insurance company) and additionally or alternatively, may execute a mobile application provided by and associated with the insurance company. For instance, user 110 may provide, as input to a web page or other graphical user interface presented by client device 104, data indicative of user 110's ownership interest in the vehicle as a portion of an application to obtain insurance coverage.

In some aspects, the provided data may identify, among other things, user 110 (e.g., full name, address, a governmental identifier (e.g., a driver's license number, social security number, etc.), etc.); the connected vehicle (e.g., a vehicle identification number (VIN), a make, a model, a year, etc.); a government-issued identifier of the vehicle (e.g., a tag number, a title number, a registration number); and a condition of the vehicle (e.g., a current mileage). Client device 104 may process and package the input data, and transmit portions of packaged data to a computer system associated with the insurance company (e.g., system 140) in support of an application for insurance coverage.

System 140 may receive data indicative of user 110's application for insurance coverage from client device 104 (e.g., in step 702), and may process and store portions of the received data within a locally accessible data repository (e.g., data repository 144), In some aspects, system 140 may extract, from the stored application data, data identifying user 110 and data identifying the connected vehicle, may parse one or more stored hybrid, blockchain ledger data structures (e.g., as stored in data repository 144), and based on the extracted data, access a hybrid, blockchain ledger data structure that tracks ownership and usage of the connected vehicle (e.g., in step 704).

In certain aspects, system 140 may process the accessed hybrid, blockchain ledger data structure to identify and extract captured sensor data characterizing a location, operation, performance, status, and/or condition of the connected vehicle and portions of metadata that augment the extracted sensor data (e.g., in step 706). For example, and as described above, one or more data blocks of the accessed hybrid, blockchain ledger data structure may include usage data repositories and encrypted metadata repositories, which system 140 may decrypt using a master key associated with the insurance company (e.g., master key 301). System 140 may, in some instances, extract the captured sensor data from corresponding ones of the decrypted usage data repositories, and extract the corresponding portions of the metadata from the decrypted metadata repositories.

As described above, the extracted sensor data may be captured by one or more integrated sensor devices incorporated into the connected device, and additionally or alternatively, by one or more external sensor devices organized into an external sensor network within which the connected device operates. In certain instances, the extracted sensor data may include, but is not limited to, a location of the connected vehicle, performance characteristics (e.g., characteristics of the vehicle's performance, such as engine temperature, fuel-air mixture, emission characteristics, etc.), usage characteristics (e.g., a current mileage, a current speed, etc.), an operational status of the vehicle (e.g., data indicative of whether scheduled maintenance is required), and a condition of the connected vehicle, as outlined above.

Further, the extracted metadata may augment portions of the extracted sensor data, and may include, among other things, timestamps associated with particular elements of sensor data, identifiers of sensor devices that captured the particular elements of sensor data (e.g., MAC addresses, IP addresses, network locations within the external sensor network, etc.), a time period during which one or more of the integrated or external sensor devices monitored the connected device, locations of corresponding ones of the integrated or external sensor devices, an IP address of the external sensor network and/or the external computer system, and identifiers of additional connected devices (e.g., connected devices 502) monitored by the integrated or external sensor devices and proximate to the connected vehicle at the corresponding timestamps.

In certain aspects, systems 140 may process the extracted sensor data and/or metadata portions to obtain usage characteristics of the connected vehicle (e.g., a mileage or a location of usage). Further, in step 708, system 140 may access one or more additional hybrid, blockchain ledger data structures (e.g., as stored within data repository 144 or as obtained from peer systems 160) that track additional connected vehicles having similar or identical makes, models, and ages, and may obtain valuations and/or life expectancies (e.g., from corresponding portions of the additional hybrid, blockchain ledger data structures) for a subset of the additional vehicles having mileages similar to those of the connected vehicle and that were operated within geographic regions that include the operational locations of the connected vehicle.

Further, and as described above, system 140 may access an encrypted rules engine (e.g., as stored locally within data repository 144), and in step 710, may decrypt the access rules engine using a master key of the rules authority (e.g., master key 301). System 140 may, in certain aspects, parse the decrypted rules engine to identify one or more proprietary operations and/or algorithms that enable system 140 to quantifies an ability and proclivity of user 110 to care for and maintain a condition of the connected vehicle (e.g., a care rating), to characterize a risk incurred by the insurance company through its indemnification of user 110's operation of the connected vehicle (e.g., a risk-exposure rating), and further, to obtain an updated valuation and/or life expectancy of the connected vehicle (e.g., in step 711).

In some aspects, and using any of the exemplary techniques described above, system 140 may compute a care rating, risk-exposure rating, valuation, and/or life expectancy of the connected vehicle in accordance with the one or more proprietary operations and/or algorithms and based on, among other things, the extracted sensor data, the corresponding metadata, and comparable valuations and life expectancies of the subset of the additional vehicles (e.g., in step 712). Further, in step 714, system 140 may perform any of the exemplary operations described above to incorporate the care ratings, the risk-exposure rating, the valuation, and/or the life expectancy of the connected vehicle into a corresponding portion of the hybrid, blockchain ledger data structure that tracks ownership and usage of the connected vehicle. As described above, one or more of peer systems 160 may act as "miners" for the vehicle-specific, hybrid, blockchain ledger, and may competitively process the transmitted data (either alone or in conjunction with other data) to generate a new ledger block, which may be appended to the vehicle-specific, hybrid blockchain ledger to record the care rating, the risk-exposure rating, and the valuation and/or life expectancy of the connected vehicle.

Further, and using any of the exemplary processes described above, system 140 may determine terms and conditions for the requested insurance policy based on, among other things, one or more proprietary underwriting standards of the insurance company, the care rating, the risk-exposure rating, and the valuation and/or life expectancy of the connected vehicle (e.g. in step 716). In some aspects, system 140 may generate terms data, which may identify the new monthly premium, an effective date (e.g., Jan. 1, 2016), and a term (e.g., six months), and transmit the terms data to a device of user 110 (e.g., device 104) across network 120 using any of the communication protocols described above (e.g., in step 718). System 140 may, in additional instances, store the terms data within a locally accessible data repository (e.g., data repository 144) with information identifying user 110 and/or the connected vehicle.

In certain aspects, client device 104 may receive and render the terms data for presentation to user 110 within a corresponding web page or GUI, and user 110 may provide input to client device 104 that evinces an acceptance or rejection of the terms data. Client device 104 may that transmit portions of the input data to across network 120 to system 140 for further processing, as described below.

In some aspects, system 140 may receive the data indicative of user 110's decision and may perform additional operations to generate the requested insurance policy or delete the term data from data repository (e.g., in step 720). For example, the received data may indicate user 110's acceptance of the proffered terms and conditions, and may include, among other things, user 110's digital signature on an electronic policy document and information identifying an electronic transfer of funds appropriate to cover at least a portion of a premium. System 140 may, in step 720, generate data that confirms an issuance of the requested insurance policy in accordance with the accepted terms and conditions, store portions of the confirmation data within a locally accessible data repository (e.g., data repository 144), and transmit a confirmation message to device 104 across network 110. Exemplary process 700 is then complete in step 722.

Through the disclosed embodiments, the exemplary hybrid blockchain ledger architectures described above may provide a centralized and transparent mechanism for tracking ownership of a particular asset or a group of assets. Further, in certain aspects, hybrid blockchain ledger data structures consistent with the disclosed embodiments may also incorporate owner-specific usage logs and data repositories that include captured location, operation, performance, and status data indicative of an owner's use of the particular asset or a group of assets at discrete point in time or aggregated over various time periods (e.g., usage data). In additional aspects, the captured location, operation, performance, and status data (e.g., the usage data) may be augmented by metadata characterizing one or more integrated and/or external sensor devices that captured the location, operation, performance, and status data (e.g., the usage data).

Further, as described above, a business entity, such as an insurance company may obtain portions of the hybrid, blockchain ledger data structure for the particular asset or groups of assets, and may access and extract usage data indicative of the owner's use and care of the particular asset or group of assets over time. In some aspects, computer systems associated with the insurance company may process the extracted usage data to quantify a condition and life expectancy of the asset and derive data indicative of the entity's care of the particular asset or groups of assets over time. These computer systems may, in certain instances, rely on the quantified condition, life expectancy, and care data to value the particular asset or groups of assets, establish a credit-worthiness of the entity, and further, quantify an institution's exposure to risk when insuring the entity and/or the particular asset or groups of assets. In certain aspects, the disclosed embodiments may enable the insurance company to customize insurance rates to reward the entity for the time-evolving care of the particular asset or groups of assets, thus customizing insurance products to the particular asset or groups of assets and further, to the current and expected future actions of the owner.

The disclosed embodiments are, however, not limited to the exemplary business entities described above. In further embodiments, other business entities, such as financial institutions and governmental entities, may extract the usage data, quantify the condition and life expectancy of the assets and derive data indicative of the entity's care of the particular asset or groups of assets over time, and rely on the quantified condition, life expectancy, and care data to value the particular asset or groups of assets, establish the credit-worthiness of the owner, and further, quantify the exposure to risk using any of the exemplary processes described above. For example, the disclosed embodiments may enable the financial institution to customize financing terms that reward the entity for the time-evolving care of the particular asset or groups of assets, thus customizing financial products to the particular asset or groups of assets and further, to the current and expected future actions of the entity. In other instances, the governmental entity (e.g., a taxing authority) may rely on, among other things, the valuation and/or the life expectancy of the asset or group of assets to impose an assessment on the asset or group of assets for computing a tax liability of the owner.

Further, although described in terms of a single asset, i.e., a connected vehicle, the disclosed embodiments are not limited to single assets, and the exemplary techniques described may be applicable to groups of assets having variable usages and/or performances. By applying the techniques described above to compute aggregated care ratings, risk-exposure ratings, valuations, and/or life expectancies of groups of assets (e.g., groups of connected office products), the disclosed embodiments may selectively balance the heavy use of a singular item with items that are used infrequently.

c. Exemplary Systems and Methods for Controlling Functionality of Internet-Connected Devices Using Asset-Specific, Hybrid, Blockchain Ledger Data Structures In the embodiments described above, computer systems associated with one or more business entities, such as financial institutions, insurance companies, and governmental entities, may rely on usage data incorporated into the exemplary asset-specific, hybrid, blockchain ledger data structures described above to generate financing terms, insurance rates, and/or asset valuations for a particular asset or groups of assets. In other aspects, however, these computer systems may monitor the usage data for various connected devices, and based on a list of triggering events incorporated into the exemplary asset-specific, hybrid, blockchain ledger data structures described above, determine an occurrence of an event that trigger a modification to one or more functionalities or operational modes of the connected devices. In some aspects, and in accordance to one or more established rules within a rules engine incorporated into the asset-specific, hybrid, blockchain ledger data structures described above, these computer systems may generate electronic commands that, upon transmission to the connected devices, cause software applications executed by the connected to modify the one or more functionalities or operational modes.

For example, and as described above, user 110 may possess an ownership interest in a connected vehicle (e.g., one of connected devices 502) capable exchanging data with one or more devices, systems, and external sensor networks operating within environment 100 (e.g., system 140 and/or peer systems 160). In some aspects, one or more of the asset-specific, hybrid, blockchain data described above may identify user 110's ownership interest in the connected vehicle, may identify the connected vehicle, and further may include usage data repositories that characterize, among other things, a time-evolving location of connected device, a time-evolving consumption of physical resources by the connected device (e.g., time-evolving consumption of fuel by the connected vehicle), a time-evolving operation of the connected vehicle by user 110 (e.g., a time-evolving mileage and/or speed of the connected vehicle), and further, a time-evolving performance of the connected vehicle (e.g., time evolution of engine characteristics, such as engine temperature, fuel-air mixture, emission characteristics, etc.). The hybrid, blockchain ledger tracking the ownership and the time-evolving locations, consumption of physical resources, usage, and/or performance of the connected vehicle may be established and maintained using any of the exemplary techniques described above, and may incorporate data captured by one or more integrated sensor devices and/or external sensor devices using any of the exemplary techniques described above.

For example, an integrated GPS sensor may capture a current position of the connected vehicle which may be transmitted to one or more of peer systems 160 for inclusion within the hybrid, blockchain ledger associated with client device 106, as described above. In other instances, client device 106 may include one or more integrated sensor devices and may execute one or more software applications that monitor a consumption of fuel by the connected vehicle, a speed of the vehicle, a mileage of the vehicle, and additionally or alternatively, one or more performance characteristics of the connected vehicle's engine. The connected vehicle may, in some aspects, transmit portions of the monitored location, fuel consumption, mileage, speed, and/or performance characteristics to one or more of peer systems 160 for inclusion within the hybrid, blockchain ledger associated with client device 106 using any of the above-described exemplary techniques.

In one embodiment, and using any of the exemplary techniques described above, system 140 may access the hybrid, blockchain ledger associated with the connected vehicle, and may identify and extract data (e.g., from a corresponding usage data repository, as described above) that characterizes a time-evolution of the location, consumption of physical resources, operational characteristics, and/or performance characteristics of the connected vehicle. System 140 may, in certain aspects, access a list of event triggers (e.g., event trigger list 322), and may determine that the location, consumption of physical resources, operational characteristics, and/or performance characteristics of the connected vehicle represent an event that would cause system 140 to modify a functionality or an operational mode of the connected vehicle. As described above, system 140 may obtain the list of event triggers from one or more locally accessible data repositories (e.g., data repository 144) or from the hybrid, blockchain ledger associated with the connected vehicle.

For example, and based on the accessed list of event triggers, system 140 may determine that a current fuel reserve of the connected vehicle falls below a threshold minimum value (e.g., 25% of a maximum fuel reserve, 10% of a maximum fuel reserve, etc.) and/or that a current location of the connected vehicle falls within a geographic region having limited access to fueling stations. System 140 may, in some aspects, access and decrypt a stored copy of an encrypted rules engine (e.g., rules engine 324, which system 140 may decrypt using master key 301), and identify one or more operations performable by system 140 and appropriate to the current fuel reserve of the connected vehicle and/or the disposition of the connected vehicle within the geographic region. In one instance, and within the decrypted rules engine, system 140 may identify one or more rules that would cause system 140 to modify functionality or an operation of the connected vehicle to reduce fuel consumption while the connected vehicle is disposed within the geographic region and/or the current fuel reserve of the connected vehicle falls below the threshold minimum value.

System 140 may, in an embodiment, generate one or more electronic commands that modify the functionality or the operation of the connected vehicle in accordance with the identified rules, and system 140 may transmit the generated electronic commands to the connected vehicle across network 120 using any of the communication protocols outlined above. In certain aspects, the connected vehicle may receive the electronic commands, which may cause one or more software applications executed by the client device (e.g., an operating system) to modify a functionality of the connected device in accordance with at least a portion of the electronic commands.

By way of example, the electronic commands may cause the executed software applications to deactivate or reduce a functionality of one or more components (e.g., an air conditioner, etc.) that, if fully functional, would increase fuel consumption. Additionally or alternatively, the generated electronic commands may cause the executed software applications to implement a governing functionality that limits a maximum speed of the connected vehicle while the connected vehicle is disposed within the geographic region and/or the current fuel reserve of the connected vehicle falls below the threshold minimum value. In further aspects, and consistent with the disclosed embodiments, the generated electronic commands may cause the executed software applications to adaptively tune an operation of a transmission to facilitate a more efficient and/or reduced consumption of fuel. The disclosed embodiments are not limited to these exemplary instructions and electronic commands, and in additional embodiments, system 140 may generate any additional or alternate electronic command to reduce the fuel consumption of the connected vehicle that would appropriate to system 140 and consistent with the exemplary hybrid blockchain ledger data structures described above.

Further, in some aspects, system 140 may execute software applications that continue to monitor the asset-specific, hybrid, blockchain data associated with the connected to determine that a current fuel reserve of the connected vehicle falls exceeds the threshold minimum value (e.g., that user 110 filled the connected device with fuel) and additionally or alternatively, that an updated location of the connected vehicle is disposed within an additional geographic region having ample access to fueling stations. Based on the decrypted rules engine, system 140 may generate one or more electronic commands to activate and/or restore the one or more modified and/or limited functionalities of the connected vehicle, as described above, and system 140 may transmit the electronic commands to the connected vehicle across network 120. Upon receipt of the one or more commands, an operating system of the connected vehicle, or one or more other mobile applications, may restore a full functionality of the connected vehicle in accordance with the electronic commands.

In other instances, user 110 may possess an ownership interest in a connected appliance, such as a connected coffee maker, capable exchanging data with one or more devices, systems, and external sensor networks operating within environment 100 (e.g., system 140 and/or peer systems 160). By way of example, one or more of the asset-specific, hybrid, blockchain data described above may identify user 110's ownership interest in the connected coffee maker, may identify the connected coffee maker, and further may include usage data repositories that characterize, among other things, a time-evolving location of the connected coffee maker (e.g., within a kitchen or a workplace of user 110), a time-evolving usage of the connected coffee maker (e.g., by tracking a number of discrete brewing cycles completed during a lifetime of the connected coffee maker), and further, time-evolving operational characteristics of the connected coffee maker (e.g., a water temperature and water volume during each of the brew cycles). The hybrid, blockchain ledger tracking the ownership and the time-evolving location, usage, and operational characteristics of the connected coffee maker may be established and maintained using any of the exemplary techniques described above, and may incorporate data captured by one or more integrated sensor devices and/or external sensor devices using any of the exemplary techniques described above.

For example, an integrated sensor device of the connected coffee maker may detect and initiation and a completion of a brew cycle, and may update stored data indicative of a cumulative number of brew cycles initiated and completed by the connected coffee maker over its lifetime (e.g., stored in a locally accessible memory or data repository). The connected coffee maker may, in some aspects, transmit data indicative of the cumulative number of brew cycles to one or more of peer systems 160 for inclusion within the hybrid, blockchain ledger associated with client device 106, as described above. In other instances, client device 106 may include one or more additional integrated sensor devices that detect one or more operational characteristics of the connected coffee maker (e.g., a water temperature and/or a water volume) during each brew cycle, which the connected coffee maker may associate with a timestamp of the brew cycle and/or the cumulative number of brew cycles an store in a locally accessible memory or data repository. The connected coffee maker may also transmit data indicative of the detected operational characteristics, as associated with the brew-cycle timestamp and/or the cumulative number of brew cycles, to one or more of peer systems 160 for inclusion within the hybrid, blockchain ledger associated with client device 106, as described above.

In one embodiment, and using any of the exemplary techniques described above, system 140 may access the hybrid, blockchain ledger associated with the connected coffee maker, and may identify and extract data (e.g., from a corresponding usage data repository, as described above) that identifies the current cumulative number of brew cycles initiated and completed by the connected coffee maker during its lifecycle (and additionally or alternatively, initiated and completed since a prior cleaning process).

System 140 may, in certain aspects, access an encrypted list of event triggers (e.g., event trigger list 322) and an encrypted rules engine (e.g., rules engine 324) using any of the exemplary techniques described above. System 140 may determine that the current cumulative number of brew cycles (e.g., over the lifecycle of the connected coffee maker or since a prior cleaning process) exceeds a threshold number of brew cycles associated with a periodic leaning operation, and may generate one or more electronic commands that modifies an operational state of the connected coffee maker and prevents user 110 from initiating any further brew cycles prior to a completion of the periodic cleaning process. As described above, system 140 may transmit the one or more electronic commands to the connected coffee maker across network 120, and the one or more electronic commands may cause software applications executed by the connected coffee maker to modify the operational state of the connected coffee maker and enforce performance of the periodic cleaning process.

In additional aspects, and based on the accessed and decrypted list of event triggers and rules engine, system 140 may determine that the current cumulative number of brew cycles exceeds a threshold number of brew cycles associated with typical lifecycle of similar connected coffee makers. System 140 may, for example, determine that the connected coffee maker is at or near an end of its effective lifecycle, and system 140 may generate data incentivizing user 110's purchase of a new connected coffee maker (e.g., a coupon, discount, etc.), which may be transmitted to a mobile communications device held by user 110 (e.g., client device 104). In certain instances, client device 104 may execute software applications that process the transmitted data and present graphical content (e.g., a bar code, QR code, etc.) and/or textual content (e.g., an alpha-numeric code) through a corresponding interface. A device at a retailer may scan the QR and/or bar code, or receive an input of the alpha-numeric code, and may enable user 110's purchase of the new connected coffee maker at a discounted price.

d. Exemplary Systems and Methods for Incentivizing User Behavior Based on Asset-Specific, Hybrid, Blockchain Ledger Data Structures In the embodiments described above, computer systems associated with one or more business entities, such as financial institutions, insurance companies, and governmental entities, may access one or more of the exemplary asset-specific, hybrid, blockchain ledger data structures described above, and may extract usage data tracking a time-evolution of an operation of one or more connected devices by corresponding owners. For example, a system associated with an insurance company (e.g., system 140) may extract, from a corresponding one of the hybrid, blockchain ledger data structures, data indicative of an operation of a connected vehicle by an owner (e.g., user 110) over one or more time periods. In certain aspects, system 140 may process and/or correlate the extracted usage data to identify one or more patterns characteristic of user 110's operation of the connected vehicle, and perform operations that reward and/or incentive particular user behavior detected within the identified usage patterns.

By way of example, and based on the extracted usage data, system 140 may determine that user 110 operates the connected vehicle along a particular section of a highway (e.g., the New Jersey Turnpike™) during a morning and evening commute (e.g., based on an integrated GPS sensor included in the connected device and based on a detection of the connected vehicle by external sensor devices disposed at toll plazas). System 140 may further process the extracted usage data, and may determine that over the past three months, user 110 operated the connected vehicle along the New Jersey Turnpike™ at an average speed of 55 miles per hour (MPH) during the morning commute, and operated the connected device at an average speed of 83 MPH during the evening commute. Additionally, system 140 may access data stored within a local data repository (e.g., data repository 144) and/or obtained from an additional system across network 120 (e.g., through an appropriate API call to a system maintained by the New Jersey Turnpike Authority™), and may determine that a speed limit of 65 MPH is enforced on the particular portion of the New Jersey Turnpike™ traversed by the connected vehicle.

In certain aspects, system 140 may access and decrypt an encrypted list of triggering events (e.g., event riggers list 322) and an encrypted rules engine (e.g., rules engine 324) using any of the exemplary techniques described above. Based on the decrypted list of triggering events and the decrypted rules engine, system 140 may execute software instructions that generate one or more incentives to encourage user 110's operation of the connected vehicle in accordance with the posted speed limit of 65 MPH during user 110's evening commute. For example, system 140 may generate incentive data that would reduce user 110's monthly insurance premium by 10% during any month in which user 110 operated the connected vehicle within 5 MPH of the posted 65 MPH speed limit. The disclosed embodiments are, however, not limited to these exemplary incentives, and in further embodiments, system 140 may generate data identifying any additional or alternate behavioral incentive that would be appropriate to user 110, system 140, and/or the connected vehicle.

System 140 may, in some instances, transmit the generated incentive data to a device of user 110 (e.g., client device 104), which may present portions of the received inventive data to user 1210 through a corresponding graphical user interface (GUI) or web page. By way of example, user 110 may review the proposed incentive, and provide input to client device 104 that evinces an acceptance, or alternatively, a refusal, of the proposed inventive. Client device 104 may package provided input into a corresponding data structure, which may be transmitted to across network 120 to system 140. System 140 may process the received input data, and based on the decision of user 110, perform operations that implement the proposed incentive or maintain user 110's current insurance premium.

Through the disclosed embodiments, the exemplary hybrid blockchain ledger architectures described above may provide a centralized and transparent mechanism for tracking ownership of a particular asset or a group of assets. Further, in certain aspects, hybrid blockchain ledger data structures consistent with the disclosed embodiments may also incorporate owner-specific usage logs and data repositories that include captured location, operation, performance, and status data indicative of an owner's use of the particular asset or a group of assets at discrete point in time or aggregated over various time periods.

In the embodiments described above, the exemplary tracked assets include a single connected vehicle and/or a single connected device (e.g., the connected coffee maker). The disclosed embodiments are not limited to these exemplary assets, and in other embodiments, single or multiple assets consistent with the disclosed embodiments may include, but are not limited to, mobile communications devices (e.g., smartphone, mobile telephones, etc.), tablet computers, laptop and/or desktop computers, network-accessible televisions, digital video recorders (DVRs), set-top boxes, network-accessible appliances, network-accessible vehicles, articles of clothing and footwear having embedded processing and communications devices, network-accessible office equipment, and any additional or alternate asset, device, or system whose usage may be tracked by one or more integrated and/or external sensor devices.

Various embodiments have been described herein with reference to the accompanying drawings. It will, however, be evident that various modifications and changes may be made thereto, and additional embodiments may be implemented, without departing from the broader scope of the disclosed embodiments as set forth in the claims that follow.

Further, other embodiments will be apparent to those skilled in the art from consideration of the specification and practice of one or more embodiments of the present disclosure. It is intended, therefore, that this disclosure and the examples herein be considered as exemplary only, with a true scope and spirit of the disclosed embodiments being indicated by the following listing of exemplary claims.

What is claimed is:

1. An apparatus, comprising: at least one processor; and a memory storing executable instructions that, when executed by the at least one processor, cause the at least one processor to perform the steps of:
    accessing usage data recorded within at least one data block of a blockchain ledger, the usage data being indicative of a usage of a device during a corresponding time period, the device being communicatively coupled to the apparatus across a communications network;
    decrypting a first encrypted portion of the at least one data block using a cryptographic key of the device, the decrypted first data portion identifying a plurality of triggering events associated with a rules authority;
    detecting an occurrence of at least one of the triggering events based on the usage data and the decrypted first data portion, the at least one of the triggering events being related to the usage of the device during the corresponding time period;
    based on the detected occurrence of the at least one of the triggering events, decrypting a second encrypted portion of the at least one data block using a master cryptographic key of the rules authority, the decrypted second data portion identifying at least one rule that exhibits a relationship with the at least one of the triggering events, the at least one rule being associated with a modification to a functionality of the device; and
    based on the decrypted second data portion, generating and transmitting information that identifies the modification to the device, the information causing the device to modify the functionality in accordance with the transmitted information.

2. The apparatus of claim 1, wherein:
    the at least one data block of the blockchain ledger comprises an additional data portion indicative of an interest of an owner in the device.

3. The apparatus of claim 2, wherein the executed instructions further cause the at least one processor to perform the steps of:
    receiving a request by the owner to access at least one of a financial or insurance product; and
    establishing, based on the usage of the device during the corresponding time period, at least one of a term or condition for the requested at least one financial or insurance product in accordance with the at least one rule.

4. The apparatus of claim 3, wherein:
    the financial product comprises at least one of (i) a debt instrument financing at least a portion of a purchase price of the device or (ii) a debt instrument that collateralizes at least a portion of the interest of the owner in the device; and
    the insurance product indemnifies at least one of the device or an operation of the device.

5. The apparatus of claim 3, wherein: the usage data identifies of at least one of a location, a performance, an operation, or a status of the device during the corresponding time period; and
    the executed instructions further cause the at least one processor to perform the steps of:
    determining, based on the usage data, at least one of (i) a first characteristic value indicative of maintenance of the device during the corresponding time period, (ii) a second characteristic value indicative of a risk associated with the requested at least one financial or insurance product, (iii) a valuation of the device, or (iv) a life expectancy of the device; and
    establishing the at least one term or condition in accordance with at least one of the determined first characteristic value, second characteristic value, valuation, or life expectancy of the device.

6. The apparatus of claim 5, wherein the executed instructions further cause the at least one processor to perform the step of transmitting at least one of the first characteristic value, second characteristic value, valuation, or life expectancy to one or more peer computer systems, the one or more peer computer systems executing software applications that generate one or more additional data blocks of the accessed blockchain ledger, the one or more additional blocks comprising at least one of the first characteristic value, second characteristic value, valuation, or life expectancy.

7. The apparatus of claim 1, wherein the detected occurrence corresponds to at least one of (i) a disposition of the device within a predetermined geographic region or (ii) a consumption of data by the device that exceeds a predetermined threshold value.

8. The apparatus of claim 1, wherein:
    the usage data comprises sensor data and metadata corresponding to at least one element of the sensor data, the sensor data specifying at least one of a location, a performance, an operation, or a status of the device at one or more intervals during the corresponding time period; and the executed instructions further cause the at least one processor to perform operations record at least a portion of the usage data within one or more additional data blocks of the blockchain ledger.

9. The apparatus of claim 8, wherein:
the metadata comprises a least one of a timestamp, an identifier of at
least one of the integrated or external sensor devices, a time period during which at least one of the integrated or external sensor devices monitored the device, a location of at least one of the integrated or external sensor devices, and an identifier of at least one second asset monitored by at least one of the integrated or external sensor devices; and
the executed instructions further cause the at least one processor to perform the step of transmitting at least the portion of the usage data to one or more peer computer systems, the one or more peer computer systems executing software applications that record the portion of the usage data within the one or more additional data blocks of the accessed blockchain ledger, and the portion of the usage data comprising the sensor data.

10. The apparatus of claim 1, wherein the executed instructions further cause the at least one processor to perform the steps of:
obtaining trigger-event data identifying a plurality of candidate triggering events; and
encrypt the trigger-event data using the private cryptographic key.

11. The apparatus of claim 1, wherein the executed instructions further cause the at least one processor to perform the steps of:
generating the master cryptographic key;
storing the generated master cryptographic key in a portion of a secure data repository;
establishing at least one access permission for the stored master cryptographic key, the at least one established access permission preventing the device from accessing the stored master cryptographic key; and
encrypt the plurality of rules associated with the rules authority using the master cryptographic key.

12. A computer-implemented method, comprising
accessing, using at least one processor, usage data recorded within at least one data block of a blockchain ledger, the usage data being indicative of a usage of a device during a corresponding time period, the device being communicatively coupled to the apparatus across a communications network;
decrypting, using the at least one processor, a first encrypted portion of the at least one data block using a cryptographic key of the device, the decrypted first data portion identifying a plurality of triggering events associated with a rules authority;
detecting, using the at least one processor, an occurrence of at least one of the triggering events based on the usage data and the decrypted first data portion, the at least one of the triggering events being related to the usage of the device during the corresponding time period;
based on the detected occurrence of the at least one of the triggering events, decrypting, using the at least one processor, a second encrypted portion of the at least one data block using a master cryptographic key of the rules authority, the decrypted second data portion identifying at least one rule that exhibits a relationship with the at least one of the triggering events, the at least one rule being associated with a modification to a functionality of the device; and
using the at least one processor, and based on the decrypted second data portion, generating and transmitting information that identifies the modification to the device, the information causing the device to modify the functionality in accordance with the transmitted information.

13. The method of claim 12, wherein the at least one data block of the blockchain ledger comprises an additional data portion indicative of an interest of an owner in the device.

14. The method of claim 13, wherein:
the method further comprises:
receiving a request by the owner to access at least one of a financial or insurance product; and
establishing, based on the usage of the first asset during the corresponding time period, at least one of a term or condition for the requested at least one financial or insurance product in accordance with the at least one rule;
the financial product comprises at least one of (i) a debt instrument financing at least a portion of a purchase price of the device or (ii) a debt instrument that collateralizes at least a portion of the interest of the owner in the device; and
the insurance product indemnifies at least one of the device or an operation of the device.

15. The method of claim 14, wherein:
the usage data is indicative of at least one of a location, a performance, and operation, or a status of the device during the corresponding time period; and
the method further comprises:
determining, based on the usage data, at least one of (i) a first characteristic value indicative of maintenance of the device by the owner during the corresponding time period, (ii) a second characteristic value
indicative of a risk associated with the requested at least one financial or insurance product, (iii) a valuation of the device, or (iv) a life expectancy of the connected device; and
establishing the at least one term or condition in accordance with at least one of the determined first characteristic value, second characteristic value, valuation, or life expectancy of the connected device;
transmitting at least one of the first characteristic value, second characteristic value, valuation, or life expectancy to one or more peer computer systems, the one or more peer computer systems executing software applications that generate one or more additional data blocks of the accessed blockchain ledger, and the one or more additional blocks comprising at least one of the first characteristic value, the second characteristic value, the valuation, or the life expectancy.

16. The apparatus of claim 12, wherein:
the detected occurrence corresponds to at least one of (i) a disposition of the device within a predetermined geographic region or (ii) a consumption of data by the device that exceeds a predetermined threshold value;
the at least one rule is associated with an additional modification to an operation of an application executed by the device; and
the method further comprises transmitting additional information identifying the additional modification to the device, the transmitted additional information causing the device to modify the operation of the executed application.

17. The method of claim 12, wherein:

the usage data comprises sensor data and metadata corresponding to at least one element of the sensor data;

the sensor data comprises first sensor data captured by at least one sensor device integrated into the connected device and second sensor data captured by at least one external sensor device disposed proximate to the connected device;

the metadata comprises a least one of a timestamp, an identifier of at least one of the integrated or external sensor devices, a time period during which at least one of the integrated or external sensor devices monitored the connected device, a location of at least one of the integrated or external sensor devices, and an identifier of at least one second asset monitored by at least one of the integrated or external sensor devices; and the method further comprises transmitting at least a portion of the usage data to one or more peer computer systems, the one or more peer computer systems executing software applications that record the portion of the usage data within one or more additional data blocks of the blockchain ledger, the recorded portion of the usage data comprising the sensor data.

18. The method of claim 12, wherein the executed instructions further cause the at least one processor to perform the steps of:

obtaining trigger-event data identifying a plurality of candidate triggering events; and encrypt the trigger-event data using the private cryptographic key.

19. The method of claim 12, wherein the executed instructions further cause the at least one processor to perform the steps of:

generating the master cryptographic key;

storing the generated master cryptographic key in a portion of a secure data repository;

establishing at least one access permission for the stored master cryptographic key, the at least one established access permission preventing the device from accessing the stored master cryptographic key; and encrypting the plurality of rules associated with the rules authority using the master cryptographic key.

20. The apparatus of claim 1, wherein:

the at least one rule is further associated with an additional modification to an operation of an application executed by the device; and the executed instructions further cause the at least one processor to perform the step of generating and transmitting additional information to the device, the additional information identifying the additional modification, and the additional information further causes the device to modify the operation of the executed application in accordance with the additional information.

21. The apparatus of claim 1, wherein the executed instructions further cause the at least one processor to perform the step of loading the master cryptographic key from a secure portion of the memory.

22. The apparatus of claim 1, wherein:

the second decrypted data portion comprises rules data associated with the rules authority, the rules data comprising corresponding data elements associated with each of the plurality of rules;

the executed instructions further cause the at least one processor to perform the step of extracting, from the rules data, one or more of the data elements associated with the at least one rule, the one or more extracted data elements comprising data that identifies the modification; and the transmitted information comprises a portion of the one or more extracted data elements.

23. A tangible, non-transitory computer-readable medium storing instructions that, when executed by at least one processor, cause the at least one processor to perform a method, comprising:

accessing usage data recorded within at least one data block of a blockchain ledger, the usage data being indicative of a usage of a device during a corresponding time period, the device being communicatively coupled to the apparatus across a communications network;

decrypting a first encrypted portion of the at least one data block using a cryptographic key of the device the decrypted first data portion identifying a plurality of triggering events associated with a rules authority;

detecting an occurrence of at least one of the triggering events based on the accessed usage data and the decrypted first data portion, the at least one of the triggering events being related to the usage of the device during the corresponding time period;

based on the detected occurrence of the at least one of the triggering events, decrypting a second encrypted portion of the at least one data block using a master cryptographic key of the rules authority, the decrypted second data portion identifying at least one rule that exhibits a relationship with the at least one of the triggering events, the at least one rule being associated with a modification to a functionality of the device; and based on the decrypted second data portion, generating and transmitting information that identifies the modification to the device, the information causing the device to modify the functionality in accordance with the transmitted information.

24. The apparatus of claim 1, wherein the executed instructions further cause the at least one processor to perform the steps of:

storing the information that identifies the modification within a usage log associated with the device, the usage log being maintained within the memory;

generating an additional data block of the blockchain ledger that includes at least the information that identifies the modification; and performing operation that record the additional data block onto the blockchain ledger.

* * * * *